(12) United States Patent
Groombridge et al.

(10) Patent No.: US 12,519,103 B2
(45) Date of Patent: Jan. 6, 2026

(54) ACTIVE ELECTRODE MATERIAL

(71) Applicant: Echion Technologies Limited, Cambridge (GB)

(72) Inventors: Alexander S. Groombridge, Cambridge (GB); Wanwei Zhang, Cambridge (GB); Sumithra Santhanam, Cambridge (GB)

(73) Assignee: Echion Technologies Limited, Cambridge (GB)

( * ) Notice: Subject to any disclaimer, the term of this patent is extended or adjusted under 35 U.S.C. 154(b) by 727 days.

(21) Appl. No.: 17/769,717

(22) PCT Filed: Oct. 8, 2020

(86) PCT No.: PCT/GB2020/052485
§ 371 (c)(1),
(2) Date: Apr. 15, 2022

(87) PCT Pub. No.: WO2021/074592
PCT Pub. Date: Apr. 22, 2021

(65) Prior Publication Data
US 2022/0380226 A1    Dec. 1, 2022

(30) Foreign Application Priority Data

Oct. 18, 2019 (GB) ..................................... 1915151
Feb. 21, 2020 (GB) ..................................... 2002487
(Continued)

(51) Int. Cl.
*H01M 4/485*    (2010.01)
*C01G 33/00*    (2006.01)
(Continued)

(52) U.S. Cl.
CPC ............ *H01M 4/485* (2013.01); *C01G 33/00* (2013.01); *C01G 33/006* (2013.01);
(Continued)

(58) Field of Classification Search
CPC ........ H01M 4/02; H01M 4/04; H01M 4/0459; H01M 4/0471; H01M 4/131;
(Continued)

(56) References Cited

U.S. PATENT DOCUMENTS 8,647,773 B2    2/2014  Goodenough et al.
9,806,339 B2   10/2017  Nakahara et al.
(Continued)

FOREIGN PATENT DOCUMENTS

CN    103456939 A    12/2013
CN    104466150 A     3/2015
(Continued)

OTHER PUBLICATIONS

Lou et al. (2019). New Anode Material for Lithium-Ion Batteries: Aluminum Niobate (AlNb11O29). ACS Applied Materials & Interfaces, 2019 11 (6), 6089-6096. (Year: 2019).*
(Continued)

*Primary Examiner* — Nicole M. Buie-Hatcher
*Assistant Examiner* — Jacob Buchanan
(74) *Attorney, Agent, or Firm* — Wolf, Greenfield & Sacks, P.C.

(57) ABSTRACT

The invention relates to active electrode materials and to methods for the manufacture of active electrode materials. Such materials are of interest as active electrode materials in lithium-ion or sodium-ion batteries. The invention provides a method of making an active electrode material, the method comprising: providing a mixed niobium oxide; combining the mixed niobium oxide with a carbon precursor to form an intermediate material, wherein the carbon precursor com-
(Continued)

prises polyaromatic sp² carbon and is selected from pitch carbons, graphene oxide, and mixtures thereof; and heating the intermediate material under reducing conditions to pyrolyse the carbon precursor forming a carbon coating on the mixed niobium oxide and introducing oxygen vacancies into the mixed niobium oxide, thereby forming the active electrode material.

30 Claims, 12 Drawing Sheets

(30) Foreign Application Priority Data

| | | | |
|---|---|---|---|
| Jun. 3, 2020 | (GB) | ..................................... | 2008352 |
| Jul. 28, 2020 | (GB) | ..................................... | 2011681 |
| Aug. 28, 2020 | (GB) | ..................................... | 2013576 |

(51) Int. Cl.
| | |
|---|---|
| *H01M 4/02* | (2006.01) |
| *H01M 4/04* | (2006.01) |
| *H01M 4/62* | (2006.01) |
| *H01M 10/0525* | (2010.01) |
| *H01M 10/44* | (2006.01) |

(52) U.S. Cl.
CPC ....... *H01M 4/0459* (2013.01); *H01M 4/0471* (2013.01); *H01M 4/625* (2013.01); *H01M 10/0525* (2013.01); *H01M 10/44* (2013.01); *C01P 2002/82* (2013.01); *C01P 2006/12* (2013.01); *H01M 2004/021* (2013.01); *H01M 2004/027* (2013.01)

(58) Field of Classification Search
CPC ......... H01M 4/139–1391; H01M 4/48; H01M 4/485; H01M 4/624–625; H01M 10/052–0525; H01M 10/44; C01G 33/00–006

See application file for complete search history.

(56) References Cited

U.S. PATENT DOCUMENTS

| | | | | |
|---|---|---|---|---|
| 10,559,811 | B2 | 2/2020 | Zhamu et al. | |
| 11,495,789 | B2 | 11/2022 | Naito et al. | |
| 2005/0164090 | A1* | 7/2005 | Kim | H01M 4/505 |
| | | | | 252/182.1 |
| 2010/0301267 | A1 | 12/2010 | Mao et al. | |
| 2012/0052401 | A1* | 3/2012 | Goodenough | C01G 33/006 |
| | | | | 429/207 |
| 2014/0272592 | A1* | 9/2014 | Thompkins | H01M 4/1395 |
| | | | | 252/182.1 |
| 2015/0010820 | A1* | 1/2015 | Takami | H01M 4/366 |
| | | | | 429/223 |
| 2015/0270543 | A1 | 9/2015 | Harada et al. | |
| 2017/0040643 | A1 | 2/2017 | Dolle et al. | |
| 2017/0077509 | A1 | 3/2017 | Ise et al. | |
| 2017/0092942 | A1* | 3/2017 | Fukasawa | H01M 10/0525 |
| 2017/0271719 | A1* | 9/2017 | Hoshina | H01M 50/562 |
| 2019/0088941 | A1* | 3/2019 | Harada | H01M 10/44 |
| 2019/0280291 | A1 | 9/2019 | Pan et al. | |
| 2019/0288283 | A1 | 9/2019 | Harada et al. | |
| 2020/0112018 | A1* | 4/2020 | Zhang | H01M 10/0565 |
| 2020/0140339 | A1 | 5/2020 | Ko et al. | |
| 2020/0152963 | A1* | 5/2020 | Zhang | H01M 4/0404 |
| 2020/0235384 | A1 | 7/2020 | Yoshioka et al. | |

FOREIGN PATENT DOCUMENTS

| | | | | |
|---|---|---|---|---|
| CN | 104968606 | A | 10/2015 | |
| CN | 103456939 | B | 12/2015 | |
| CN | 106299329 | A | 1/2017 | |
| CN | 109167049 | A | 1/2019 | |
| CN | 109244443 | A * | 1/2019 | ........ H01M 10/0525 |
| CN | 109360978 | A * | 2/2019 | ............ C01G 33/00 |
| EP | 2 361 888 | A2 | 8/2011 | |
| EP | 2 515 365 | A1 | 10/2012 | |
| EP | 2 840 631 | A1 | 2/2015 | |
| EP | 2 840 631 | A4 | 10/2015 | |
| EP | 2 980 891 | A1 | 2/2016 | |
| EP | 3 070 767 | A1 | 6/2016 | |
| EP | 2 840 631 | B1 | 4/2017 | |
| EP | 2 515 365 | B1 | 2/2018 | |
| JP | 2013-134921 | A | 7/2013 | |
| JP | 2017-199670 | A | 11/2017 | |
| KR | 2015-0032781 | A | 3/2015 | |
| KR | 20150131800 | A | 11/2015 | |
| WO | WO 2005/011030 | A1 | 2/2005 | |
| WO | WO 2015/138019 | A1 | 9/2015 | |
| WO | WO 2019/093404 | A1 | 5/2019 | |
| WO | WO 2019/234248 | A1 | 12/2019 | |
| WO | WO 2021/074593 | A1 | 4/2021 | |
| WO | WO 2021/074594 | A1 | 4/2021 | |

OTHER PUBLICATIONS

Machine translation of Zhang, CN 109244443. Originally available Jan. 18, 2019. (Year: 2019).*
Machine translation of Zhang, CN 109360978. Originally available Feb. 19, 2019. (Year: 2019).*
International Search Report and Written Opinion for International Application No. PCT/GB2020/052485 dated Mar. 12, 2021.
International Preliminary Report on Patentability for International Application No. PCT/GB2020/052485 dated Jan. 25, 2022.
Search Report under Section 17 for Application No. GB2002487.3 dated Apr. 10, 2020.
Further Search Report under Section 17 for Application No. GB2002487.3 dated May 13, 2020.
Search Report under Section 17 for Application No. GB2008352.3 dated Jul. 9, 2020.
Search Report under Section 17 for Application No. GB2011681.0 dated Sep. 8, 2020.
Search Report under Section 17 for Application No. GB2013576.0 dated Oct. 20, 2020.
[No Author Listed], Standard Test Method for Softening Point of Pitch (Cube-in-Air Method). Designation: D2319/D2319M-14E1. ASTM International. May 1, 2014:3 pages.
[No Author Listed], Standard Test Method for Softening Point of Pitches (Mettler Softening Point Method). Designation: D3104-14a. ASTM International. 2018:7 pages.
Bergner et al., VNb9O25-δ-Synthesis, electrical conducting behaviour and density functional theory (DFT) calculation. J Solid State Chem. Aug. 2009;182(8):2053-60.
Botella et al., Mo-W-containing tetragonal tungsten bronzes through isomorphic substitution of molybdenum by tungsten. Catalysis Today. Dec. 5, 2010;158(1-2):162-9.
Cava et al., Lithium Insertion in Wadsley-Roth Phases Based on Niobium Oxide. J Electrochem Soc. Jan. 1, 1983;130(12):2345-51.
Cava et al., Lithium insertion, electrical conductivity, and chemical substitution in various crystallographic shear structures. Solid State Ionics. Dec. 1983;9-10(Part 1):407-11.
Deng et al., Boosting fast energy storage by synergistic engineering of carbon and deficiency. Nat Commun. Jan. 9, 2020;11(132):33 pages. doi: 10.1038/s41467-019-13945-1. Supplementary Information.
Escamilla-Perez et al., Pitch-based carbon/nano-silicon composite, an efficient anode for Li-ion batteries. RSC Adv. Apr. 4, 2019;9(19):10546-53.
Goodenough et al., The Li-ion rechargeable battery: a perspective. J Am Chem Soc. Jan. 30, 2013;135(4):1167-76. doi: 10.1021/ja3091438. Epub Jan. 18, 2013.
Griffith et al., High-Rate Intercalation without Nanostructuring in Metastable Nb2O5 Bronze Phases. J Am Chem Soc. Jul. 20, 2016;138(28):8888-99. doi: 10.1021/jacs.6b04345. Epub Jul. 10, 2016.

(56) References Cited

OTHER PUBLICATIONS

Griffith et al., Structural Stability from Crystallographic Shear in $TiO_2$—$Nb_2O_5$ Phases: Cation Ordering and Lithiation Behavior of $TiNb_{24}O_{62}$. Inorg Chem. Mar. 20, 2017;56(7):4002-10.

Han et al., Coating of graphite anode with coal tar pitch as an effective precursor for enhancing the rate performance in Li-ion batteries: Effects of composition and softening points of coal tar pitch. Carbon. Nov. 2015;94:432-8.

Han et al., New Anode Framework for Rechargeable Lithium Batteries. Chem Mater. Mar. 29, 2011;23(8):2027-9.

Jayaprakash et al., A new class of tailor-made $Fe_{0.92}Mn_{0.08}Si_2$ lithium battery anodes: Effect of composite and carbon coated $Fe_{0.92}Mn_{0.08}Si_2$ anodes. Intermetallics. Mar. 2007:15(3):442-50.

Jo et al., Effect of petroleum pitch coating on electrochemical performance of graphite as anode materials. Korean J Chem Eng. Oct. 3, 2019;36(10):1724-31.

Jo et al., Synthesis and Electrochemical Reaction of a Pitch Carbon-Coated Zinc Vanadium Oxide Anode with Excellent Electrochemical Performance for Rechargeable Lithium Batteries. ACS Sustainable Chem Eng. Jan. 15, 2020;8(4):1908-15.

Lou et al., New Anode Material for Lithium-Ion Batteries: Aluminum Niobate ($AlNb_{11}O_{29}$). ACS Appl Mater Interfaces. Feb. 13, 2019;11(6):6089-6096. doi: 10.1021/acsami.8b20246. Epub Feb. 4, 2019. Supporting Information.

Montemayor et al., Lithium insertion in two tetragonal tungsten bronze type phases, $M_8W_9O_{47}$ (M=Nb and Ta). J Mater Chem. 1998;8(12):2777-81.

Morcrette et al., In situ X-ray diffraction techniques as a powerful tool to study battery electrode materials. Electrochim Acta. Jul. 27, 2002;47(19):3137-49.

Patoux et al., A Reversible Lithium Intercalation Process in an $ReO_3$—Type Structure $PNb_9O_{25}$. J Electrochem Soc. Feb. 19, 2002;149(4):A391-400.

Preefer et al., Multielectron Redox and Insulator-to-Metal Transition upon Lithium Insertion in the Fast-Charging, Wadsley-Roth Phase $PNb_9O_{25}$. Chem Mater. May 13, 2020;32(11):4553-63. Author manuscript provided. 59 pages.

Saritha et al., Electrochemical Li insertion studies on $WNb_{12}O_{33}$—A shear $ReO_3$ type structure. J Solid State Chem. May 2010;183(5):988-93.

West, Extended Defects. Solid State Chemistry and its Applications. Second Edition. 2014:108.

Yan et al., Electrospun $WNb_{12}O_{33}$ nanowires: superior lithium storage capability and their working mechanism. J Mater Chem A. Apr. 10, 2017;5(19):8972-80.

Yu et al., The journey of lithium ions in the lattice of $PNb_9O_{25}$. Mater Chem Front. Dec. 20, 2019;4(2):631-7.

Lou et al., Nb-Based Oxides as Anode Materials for Lithium Ion Batteries. Progress in Chemistry. Mar. 2015;27(2/3):297-309.

Griffith et al., Niobium tungsten oxides for high-rate lithium-ion energy storage. Nature. Jul. 2018;559(7715):556-563. doi: 10.1038/s41586-018-0347-0. Epub Jul. 25, 2018.

Lin et al., Defective $Ti_2Nb_{10}O_{27.1}$: an advanced anode material for lithium-ion batteries. Sci Rep. Dec. 3, 2015;5(17836): 12 pages. doi: 10.1038/srep17836.

\* cited by examiner

ACTIVE ELECTRODE MATERIAL

RELATED APPLICATIONS

This Application is a national stage filing under 35 U.S.C. § 371 of International Patent Application Serial No. PCT/GB2020/052485, filed Oct. 8, 2020, entitled "Active Electrode Material" which claims priority to GB application number 2013576.0, filed Aug. 28, 2020, GB application number 2011681.0, filed Jul. 28, 2020, GB application number 2008352.3, filed Jun. 3, 2020, GB application number 2002487.3, filed Feb. 21, 2020, and GB application number 1915151.3, filed Oct. 18, 2019, each of which is herein incorporated by reference in their entireties.

FIELD OF THE INVENTION

The present invention relates to active electrode materials and to methods for the manufacture of active electrode materials. Such materials are of interest as active electrode materials in lithium-ion or sodium-ion batteries, for example as anode materials for lithium-ion batteries.

BACKGROUND

Lithium-ion (Li-ion) batteries are a commonly used type of rechargeable battery with a global market predicted to grow to $200bn by 2030. Li-ion batteries are the technology of choice for electric vehicles that have multiple demands across technical performance to environmental impact, providing a viable pathway for a green automotive industry.

A typical lithium-ion battery is composed of multiple cells connected in series or in parallel. Each individual cell is usually composed of an anode (negative polarity electrode) and a cathode (positive polarity electrode), separated by a porous, electrically insulating membrane (called a separator), immersed into a liquid (called an electrolyte) enabling lithium ions transport.

In most systems, the electrodes are composed of an electrochemically active material—meaning that it is able to chemically react with lithium ions to store and release them reversibly in a controlled manner—mixed if necessary with an electrically conductive additive (such as carbon) and a polymeric binder. A slurry of these components is coated on a thin film on a current collector (typically a thin foil of copper or aluminium), thus forming the electrode upon drying.

In the known Li-ion battery technology, the safety limitations of graphite anodes upon battery charging is a serious impediment to its application in high-power electronics, automotive and industry. Among a wide range of potential alternatives proposed recently, lithium titanate (LTO) and mixed niobium oxide-based materials are the main contenders to replace graphite as the active material of choice for high power applications.

Batteries relying on a graphitic anode are fundamentally limited in terms of charging rate. Under nominal conditions, lithium ions are inserted into the anode active material upon charging. When charging rate increases, typical graphite voltage profiles are such that there is a high risk that overpotentials lead to the potential of sites on the anode to become <0 V vs. Li/Li+, which leads to a phenomenon called lithium dendrite electroplating, whereby lithium ions instead deposit at the surface of the graphite electrode as lithium metal. This leads to irreversible loss of active lithium and hence rapid capacity fade of the cell. In some cases, these dendritic deposits can grow to such large sizes that they pierce the battery separator and lead to a short-circuit of the cell. This can trigger a catastrophic failure of the cell leading to a fire or an explosion. Accordingly, the fastest-charging batteries having graphitic anodes are limited to charging rates of 5-7 C, but often much less.

Lithium titanate (LTO) anodes do not suffer from dendrite electroplating at high charging rate thanks to their high potential (1.6 V vs. Li/Li+), and have excellent cycle life as they do not suffer from significant volume expansion of the active material upon intercalation of Li ions due to their accommodating 3D crystal structure. LTO cells are typically regarded as high safety cells for these two reasons. However, LTO is a relatively poor electronic and ionic conductor, which leads to limited capacity retention at high rate and resultant power performance, unless the material is nano-sized to increase specific surface area, and carbon-coated to increase electronic conductivity. This particle-level material engineering increases the porosity and specific surface area of the active material, and results in a significantly lower achievable packing density in an electrode. This is significant because it leads to low density electrodes and a higher fraction of electrochemically inactive material (e.g. binder, carbon additive), resulting in much lower gravimetric and volumetric energy densities.

A key measure of anode performance is the electrode volumetric capacity (mAh/cm$^3$), that is, the amount of electric charges (that is lithium ions) that can be stored per unit volume of the anode. This is an important factor to determine the overall battery energy density on a volumetric basis (Wh/L) when combined with the cathode and appropriate cell design parameters. Electrode volumetric capacity can be approximated as the product of electrode density (g/cm$^3$), active material specific capacity (mAh/g), and fraction of active material in the electrode. LTO anodes typically have relatively low specific capacities (c. 165 mAh/g, to be compared with c. 330 mAh/g for graphite) which, combined with their low electrode densities (typically <2.0 g/cm$^3$) and low active material fractions (<90%) discussed above, lead to very low volumetric capacities (<300 mAh/cm$^3$) and therefore low battery energy density and high $/kWh cost in various applications. As a result, LTO batteries/cells are generally limited to specific niche applications, despite their long cycle life, fast-charging capability, and high safety.

Mixed niobium oxides (MNO) were first identified as potential battery materials in the academic literature in the 1980's,[2,3] but have only seen a commercial focus since the 2010's with the demonstration of a practical cell combining a TiNb$_2$O$_7$ and a commercially-available LNMO (lithium nickel manganese oxide) cathode showing promising performance in terms of rate capability, cycle life, and energy density.[1] Selected MNO anodes such as TiNb$_2$O$_7$ offer characteristics that are similar to LTO in terms of high operating potential vs. Li/Li+ (1.6 V) and low volume expansion (<5%) leading to safe fast-charge and long cycle life (>10,000 cycles). A key advantage of MNO anodes is that practical specific capacities significantly higher than LTO (c. 170 mAh/g) can be achieved (c. 200-300 mAh/g for TiNb$_2$O$_7$), which improves cell energy density. In contrast to LTO materials ($10^{-17}$ cm$^2$ s$^{-1}$), the Li-ion diffusion coefficient is typically much higher for specific MNO compositions that result in so-called "Wadsley-Roth" or "Tetragonal Tungsten Bronze" crystal structures ($10^{-14}$-$10^{-10}$ cm$^2$ s$^{-1}$).[4] This means that Li ions will diffuse across much greater distances through the active material within the same time for MNO materials vs LTO, at a fixed charge/discharge rate. Therefore, MNO materials can be less porous and use larger primary particles/crystals (0.5-10 μm for MNO vs <100 nm for LTO), retaining or improving the high-power charge/discharge performance. This results in higher electrode densities, and volumetric energy densities of cells, leading to a lower $/kWh cost at the application level.

However, electronic conductivities are typically too low in MNO materials such as $TiNb_2O_7$ to sustain fast charge and discharge rates without requiring some degree of active material particle or anode electrode engineering, similar to that of LTO-type materials. This electrical conductivity is thought to be both poor at the surface of the materials (i.e. charge transfer resistance), and throughout the material itself, severely affecting the conduction of electrons to the current collector on charge and discharge. If this is not significantly improved, then there is excess electrical resistance in a resultant device, leading to increased polarisation, reduced power densities, and lower energy efficiencies. Accordingly, there remains a need to further improve the properties of mixed niobium oxides for use in lithium-ion batteries.

U.S. Pat. No. 8,647,773 discloses carbon coated $Li_xM_{1-y}Nb_yNb_2O_7$ where 0<x<3, 0<y<1, M=Ti or Zr. The oxide composition with carbon coating achieved using sucrose shows improvement in electronic conductivity and high specific capacity. The material did not show large reductions in polarisation of the material versus un-carbon coated.

CN109167049A discloses a graphene-coated titanium niobium oxide composite electrode material, which is characterized by a $TiNb_xO_{(2+2.5x)}$ core and a graphene coating layer. layer, and the mass fraction of the graphene coating layer is 0.01%-5%.

US 2015/0010820 A1 discloses $TiNb_2O_7$ with a coating derived from carboxymethylcellulose.

U.S. Pat. No. 9,806,339 discloses carbon coated $TiNb_xO_{(2+5x/2)}$ 1.9<x≤2.0 said to have enhanced charge discharge capacity and rate performance. The carbon coating is achieved by spray drying the oxide with glucose in aqueous slurry and further pyrolyzed in non-oxidising atmosphere at 650-800° C. to carbonise the organics.

Deng et al., Nature Communications, volume 11, Article number: 132 (2020), discloses $Ti_2Nb_{10}O_{29-x}$@C composites formed of nanograins of TNO with a highly crystalline carbon coating derived from acetylene. The composites are prepared by a complex method which would be difficult to scale up.

WO2005011030A1 discloses ultra-fine Si anode material mixed with carbon active and metal oxide is surface coated with amorphous carbon. The amorphous carbon was achieved by mixing the anode with coal tar pitch and heating at 900° C. in Ar atmosphere for 1 hr. It is widely known that Si suffers from volume expansion and SEI formation at low V, so requires specific engineering such as a carbon coating if it is to be used as an anode material.

Pitch coating has been used to improve artificial graphite anodes which suffer from solid electrolyte interphase (SEI) layer and volume expansion. It has been shown by Yoon et. al.[5] that 10 wt % petroleum pitch with softening point (250° C.) with artificial graphite showed improved electrochemical performance. The amorphous carbon coating on graphite achieved by pyrolysis at 1000° C. resulted in high initial coloumbic efficiency (92%), discharge capacity (343 mAh/g), cycle stability (97%) and rate performance of 10 C (84%). Similar for Si, carbon coatings are typically used for artificial graphite to reduce volume expansion, improve general conductivity, and to reduce SE.

The present invention has been devised in light of the above considerations.

SUMMARY OF THE INVENTION

In a first aspect, the invention provides a method of making an active electrode material, the method comprising: providing a mixed niobium oxide; combining the mixed niobium oxide with a carbon precursor to form an intermediate material, wherein the carbon precursor comprises polyaromatic $sp^2$ carbon and is selected from pitch carbons, graphene oxide, and mixtures thereof; and heating the intermediate material under reducing conditions to pyrolyse the carbon precursor forming a carbon coating on the mixed niobium oxide and introducing oxygen vacancies into the mixed niobium oxide, thereby forming the active electrode material.

The method of the first aspect provides a solution to the problems associated with mixed niobium oxides noted above. This is achieved via the combination of the type of carbon precursor and the type of heat treatment. These provide the synergistic benefit of forming a specific type of carbon coating on the mixed niobium oxide and introducing oxygen vacancies into the mixed niobium oxide. The coating formed from polyaromatic $sp^2$ carbon improves the surface electronic conductivity of the mixed niobium oxide. The use of a polyaromatic $sp^2$ carbon precursor selected from pitch carbons, graphene oxide, and mixtures thereof is particularly beneficial because the carbon chemistry is largely retained during pyrolysis, resulting in a carbon coating comprising polyaromatic $sp^2$ carbon derived from a specific source. Pyrolysis of a polyaromatic $sp^2$ carbon precursor material under reducing conditions results in the domains of $sp^2$ aromatic carbon increasing in size thus improving surface and contact electrical conductivity, and the associated loss of gases such as $H_2$ or $C_2H_2$. As there is close contact with the surface of the active material, these gases promote the reduction of the mixed niobium oxide materials to provide oxygen vacancies (deficiencies) in the crystal. Moreover, the close contact between the $sp^2$ carbon and the oxide surface is believed to catalytically promote reduction at high temperature reducing conditions. Such a coating is beneficial because of its associated high conductivity from presence of a delocalised $sp^2$ bonding network over an extended area, increased mechanical integrity with a partially semi-crystalline coating that is not brittle or rigid, and efficient conformal coating by not utilising rigid crystalline precursor carbon materials. The oxygen vacancies improve the bulk conductivity of the mixed niobium oxide. In this way, the properties of the mixed niobium oxide are improved for use as an active electrode material, e.g. as an active anode material in a metal-ion battery. A further advantage of the method is that each step is suitable for use at both small laboratory scales and large industrial scales. The invention also avoids the use of complex carbon coating techniques such as CVD. The method is thus appropriate for the large-scale industrial manufacture of active electrode materials.

The active electrode materials made by the invention are particularly useful in electrodes, preferably in anodes for lithium-ion batteries. Therefore, in a second aspect the invention provides a method of making an electrode, comprising making an active electrode material by following the method for making an active electrode material of the first aspect, and forming an electrode comprising the active electrode material in electrical contact with a current collector. The second aspect may include a further step of forming a cell comprising the electrode. The second aspect may include a further step of forming a metal-ion battery, preferably a lithium-ion battery, comprising the electrode, where the electrode is the anode of the metal-ion battery.

In a third aspect, the invention provides an active electrode material formed of an oxygen-deficient mixed niobium oxide, wherein the oxygen-deficient mixed niobium oxide comprises a carbon coating comprising polyaromatic $sp^2$ carbon.

The invention includes the combination of the aspects and features described herein except where such a combination is clearly impermissible or expressly avoided. In particular, features describing the method of making an active electrode material may also be used to describe the active electrode material per se, and vice versa.

SUMMARY OF THE FIGURES

The principles of the invention will now be discussed with reference to the accompanying figures in which.

DETAILED DESCRIPTION OF THE INVENTION

Figure 1:
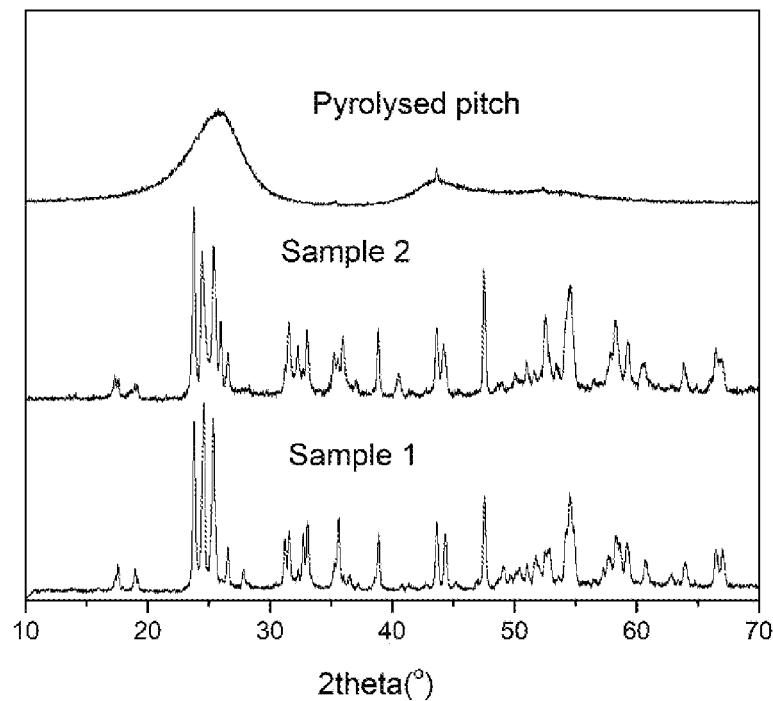
FIG. 1: Powder XRD of a reference sample of petroleum pitch that has been pyrolysed under $N_2$ at 900° C. for 5 h to provide pyrolysed pitch, Sample 1, and Sample 2. In Sample 2 some peak changes and additional peaks can be observed, due to the induced oxygen deficiency and the presence of the carbon coating.

Aspects and embodiments of the present invention will now be discussed with reference to the accompanying figures. Further aspects and embodiments will be apparent to those skilled in the art. All documents mentioned in this text are incorporated herein by reference.

The term "mixed niobium oxide" (MNO) refers to an oxide comprising niobium and at least one other cation. MNO materials have a high redox voltage vs. Lithium >0.8V, enabling safe and long lifetime operation, crucial for fast charging battery cells. Moreover, niobium cations can have two redox reactions per atom, resulting in higher theoretical capacities than, for example, LTO.

The mixed niobium oxide may have a $ReO_3$-derived $MO_{3-x}$ crystal structure. Preferably, the mixed niobium oxide has a Wadsley-Roth or Tetragonal Tungsten Bronze ("TTB" or "bronze") crystal structure, most preferably a Wadsley-Roth structure. Both Wadsley-Roth and bronze crystal structures are considered to be a crystallographic off-stoichiometry of the $MO_3(ReO_3)$ crystal structure, with simplified formula of $MO_{3-x}$. As a result, these structures typically contain $[MO_6]$ octahedral subunits in their crystal structure alongside others. Mixed niobium oxides with these structures are believed to have advantageous properties for use as active electrode materials, e.g. in lithium-ion batteries.

The open tunnel-like $MO_3$ crystal structure of MNOs also makes them ideal candidates for high capacity and high rate intercalation. The crystallographic off-stoichiometry that is introduced in $MO_{3-x}$ structures causes crystallographic superstructures such as the Wadsley-Roth shear and the Bronze structures. These superstructures, compounded by other qualities such as the Jahn-Teller effect and crystallographic disorder by making use of multiple mixed cations, stabilise the crystal and keep the tunnels open and stable during intercalation, enabling extremely high rate performance.

The crystal formula of a charge balanced and thermodynamically stable Wadsley-Roth crystal structure obeys the following formula:

$$(M_1, M_2, M_3, \ldots)_{mnp+1}O_{3mnp-(m+n)p+4} \quad (1)$$

In this formula, O is oxygen (the anion) and M (the cation) can be any alkali metal, alkali earth metal, transition element, semi-metal, or non-metal if the correct proportions are used to provide a stable structure. In the invention, at least one of ($M_1$, $M_2$, $M_3$ . . . ) comprises Nb.

Formula (1) is based on crystal topography: m and n are the dimensions of the formed edge sharing superstructure blocks, ranging from 3-5 (integers). At the corner, blocks are connected into infinite ribbons (p=∞) only by edge-sharing, into pairs (p=2) by partly edge-sharing and partly tetrahedra or into isolated blocks only by tetrahedra (p=1). When p is infinity the formula becomes:

$$(M_1, M_2, M_3, \ldots)_{mn} O_{3mn-(m+n)} \quad (2)$$

More information can be found in work by Griffith et al.[6]

Together, formula (1) and (2) define the full composition range for Wadsley-Roth crystal structures. The total crystal composition should also be charge neutral and thermodynamically favourable to follow the above description. Structures partially deficient in their oxygen content through introduction of oxygen vacancy defects are preferable when reducing the material's electrical resistance such that $M_xO_y$ becomes $M_xO_{y-\delta}$ where $0\% \leq \delta \leq 5\%$, i.e. the oxygen content is reduced by up to 5 atomic % relative to the amount of oxygen present.

Tetragonal tungsten bronze crystal structures are phases formed of a framework of [MO$_6$] octahedra sharing corners linked in such a way that three, four and five sided tunnels are formed (Montemayor et al.,[7] e.g. $M_8W_9O_{47}$). A bronze structure does not have to include tungsten[8]. A number of 5-sided tunnels are filled with (M$_1$, M$_2$, M$_3$ . . . ), O, or a suitable cation to form the pentagonal columns. In the structure the pentagonal bipyramid MO$_7$ shares edge with five MOs octahedra. In the invention, at least one of (M$_1$, M$_2$, M$_3$ . . . ) comprises Nb. Structures partially deficient in their oxygen content through introduction of oxygen vacancy defects are preferable when reducing the materials electrical resistance such that $M_xO_y$ becomes $M_xO_{y-\delta}$ where $0\% \leq \delta \leq 5\%$, i.e. the oxygen content is reduced by up to 5 atomic % relative to the amount of oxygen present.

The crystal structure of a material may be determined by analysis of X-ray diffraction (XRD) patterns, as is widely known. For instance, XRD patterns obtained from a given material can be compared to known XRD patterns to confirm the crystal structure, e.g. via public databases such as the JCPDS crystallography database. Rietveld analysis can also be used to determine the crystal structure. Therefore, the mixed niobium oxide may have a Wadsley-Roth or Tetragonal Tungsten Bronze crystal structure, as determined by X-ray diffraction.

Preferably, the crystal structure of the mixed niobium oxide, as determined by X-ray diffraction, corresponds to the crystal structure of one or more of: $WNb_{12}O_{33}$, $W_4Nb_{26}O_{77}$, $W_3Nb_{14}O_{44}$, $W_5Nb_{16}O_{55}$, $W_8Nb_{18}O_{69}$, $WNb_2O_8$, $W_{16}Nb_{18}O_{93}$, $W_{20}Nb_{22}O_{115}$, $W_9Nb_8O_{47}$, $W_{82}Nb_{54}O_{381}$, $W_{31}Nb_{20}O_{143}$, $W_7Nb_4O_{31}$, $W_{15}Nb_2O_{50}$, $Mo_3Nb_2O_{14}$, $Mo_3Nb_{14}O_{44}$, $MoNb_{12}O_{33}$, $ZrNb_{24}O_{62}$, $PNb_9O_{25}$, $VNb_9O_{25}$, $TiNb_2O_7$, $Ti_2Nb_{10}O_{29}$, $Ti_2Nb_{14}O_{39}$, $TiNb_{24}O_{62}$, $FeNb_{11}O_{29}$, $GaNb_{11}O_{29}$, $CrNb_{11}O_{29}$, $GaNb_{49}O_{124}$, $Mg_2Nb_{34}O_{37}$, $HfNb_{24}O_{62}$, $Al_{0.5}Nb_{24.5}O_{62}$, $Fe_{0.5}Nb_{24.5}O_{62}$, $Cr_{0.5}Nb_{24.5}O_{62}$, $KNb_5O_{13}$, $K_6Nb_{10.8}O_{30}$, $V_4Nb_{18}O_{55}$, $ZrNb_{14}O_{37}$, $TiNb_6O_{17}$, $GeNb_{18}O_{47}$, $MnNb_2O_6$, $W_{11}Nb_{12}O_{63}$, $Zn_2Nb_{34}O_{87}$, or $AlNb_{11}O_{29}$; or one or more of $MoNb_{12}O_{33}$, $WNb_{12}O_{33}$, $PNb_9O_{25}$, $ZrNb_{24}O_{62}$, $VNb_9O_{25}$, $W_7Nb_4O_{31}$, and $W_9Nb_8O_{47}$; most preferably one or more of $MoNb_{12}O_{33}$, $WNb_{12}O_{33}$, $ZrNb_{24}O_{62}$, $VNb_9O_{25}$, $W_7Nb_4O_{31}$, and $W_9Nb_8O_{47}$.

Here the term 'corresponds' is intended to reflect that peaks in an X-ray diffraction pattern may be shifted by no more than 0.5 degrees (preferably shifted by no more than 0.2 degrees, more preferably shifted by no more than 0.1 degrees) from corresponding peaks in an X-ray diffraction pattern of the material listed above (e.g. $MoNb_{12}O_{33}$ etc.). Optionally, the crystal structure of the mixed niobium oxide does not correspond to the crystal structure of $TiNb_2O_7$, for example, optionally the measured XRD diffraction pattern of the active electrode material does not correspond to the JCPDS crystallography database entry database 00-039-1407, for $TiNb_2O_7$. Optionally, the crystal structure of the active electrode material does not correspond to the crystal structure of $M^{III}Nb_{11}O_{29}$ for example $FeNb_{11}O_{29}$, $GaNb_{11}O_{29}$, $CrNb_{11}O_{29}$, and $AlNb_{11}O_{29}$.

The mixed niobium oxide, including the oxygen-deficient mixed niobium oxide, may be expressed by the formula $MNb_bO_c$ (Formula 1). M represents one or more cations. For example M may represent one or more of P, Ti, Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd. b satisfies $0.13 \leq b \leq 49$. c satisfies $3.3 \leq c \leq 124$. For the oxygen-deficient mixed niobium oxide, c may be defined in the format $c=(c'-c'\alpha)$ where $\alpha$ is a non-integer value less than 1, for example where $\alpha$ satisfies $0<\alpha \leq 0.05$. When $\alpha$ is 0.05, the number of oxygen vacancies is equivalent to 5% of the total oxygen in the crystal structure. $\alpha$ may be greater than 0.001 (0.1% oxygen vacancies), greater than 0.002 (0.2% oxygen vacancies), greater than 0.005 (0.5% oxygen vacancies), or greater than 0.01 (1% oxygen vacancies). $\alpha$ may be less than 0.04 (4% oxygen vacancies), less than 0.03 (3% oxygen vacancies), less than 0.02 (2% oxygen vacancies), or less than 0.1 (1% oxygen vacancies). For example, $\alpha$ may satisfy $0.001 \leq \alpha \leq 0.05$.

The mixed niobium oxide, including the oxygen-deficient mixed niobium oxide, may be expressed by the formula $[M1]_x[M2]_{(1-x)}[Nb]_y[O]_z$ (Formula 2), wherein:

M1 and M2 are different;

M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd;

M2 represents one or more of Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd; and wherein x satisfies $0<x<0.5$;

y satisfies $0.5 \leq y \leq 49$ z satisfies $4 \leq z \leq 124$.

Such materials may offer improved electrochemical properties in comparison to materials having the general formula $MNb_bO_c$ where M represents a single cation.

By 'represents one or more of', it is intended that either M1 or M2 may each represent two or more elements from their respective lists. An example of such a material is $Ti_{0.05}W_{0.25}Mo_{0.70}Nb_{12}O_{33}$. Here, M1 represents $Ti_{x'}W_{x''}$ (where x'+x''=x), M2 represents Mo, x=0.3, y=12, z=33. Another example of such a material is $Ti_{0.05}Zr_{0.05}W_{0.25}Mo_{0.65}Nb_{12}O_{33}$. Here, M1 represents $Ti_{x'}Zr_{x''}W_{x'''}$ (where x'+x''+x'''=x), M2 represents Mo, x=0.35, y=12, z=33.

In Formula 2 M2 does not represent Ti. In other words, in Formula 2 preferably Ti is not the major non-Nb cation. Where M1 represents Ti alone, preferably x is 0.05 or less. Where M1 represents one or more cations including Ti, preferably the amount of Ti relative to the total amount of non-Nb cations is 0.05:1 or less. M2 may represent one or more of Mo, W, V, Zr, Al, Ga, Ge, Zn, Ta, Cr, Cu, K, Mg, Ni, Hf; or one or more of Mo, W, V, Zr, Al, Ga, Ge, Zn, Ta, Cu, K, Mg; or preferably one or more of Mo, W, V, or Zr. As x satisfies $0<x<0.5$, M2 is the major non-Nb cation in Formula 2. Preferably x satisfies $0.01 \leq x \leq 0.4$, more preferably x satisfies $0.05 \leq x \leq 0.25$, for example, x may be about 0.05.

M1 may represent one or more of K, Mg, Ca, Y, Ti, Zr, Hf, V, Ta, Cr, Mo, W, Mn, Fe, Co, Ni, Cu, Zn, Al, Ga, Si, Ge, Sn, Sb; or one or more of Ti, Mg, V, Cr, W, Zr, Mo, Cu, Ga, Ge, K, Ni, Al, Hf, Ta, or Zn; or preferably one or more of Ti, Mg, V, Cr, W, Zr, Mo, Ga, Ge, Al, or Zn.

The precise values of y and z within the ranges defined may be selected to provide a charge balanced, or substantially charge balanced, crystal structure. Additionally or alternatively, the precise values of y and z within the ranges defined may be selected to provide a thermodynamically stable, or thermodynamically metastable, crystal structure.

In some cases, z may be defined in the format $z=(z'-z'\alpha)$, where $\alpha$ is a non-integer value less than 1, for example where $\alpha$ satisfies $0 \leq \alpha \leq 0.05$. $\alpha$ may be greater than 0, i.e. $\alpha$ may satisfy $0 < \alpha \leq 0.05$. When $\alpha$ is greater than 0, Formula 2 is an oxygen-deficient material, i.e. the material has oxygen vacancies. Such a material would not have precise charge balance, but is considered to be "substantially charge balanced" as indicated above. Alternatively, $\alpha$ may equal 0, in which Formula 2 is not an oxygen-deficient material.

When $\alpha$ is 0.05, the number of oxygen vacancies is equivalent to 5% of the total oxygen in the crystal structure. $\alpha$ may be greater than 0.001 (0.1% oxygen vacancies), greater than 0.002 (0.2% oxygen vacancies), greater than 0.005 (0.5% oxygen vacancies), or greater than 0.01 (1% oxygen vacancies). $\alpha$ may be less than 0.04 (4% oxygen vacancies), less than 0.03 (3% oxygen vacancies), less than 0.02 (2% oxygen vacancies), or less than 0.1 (1% oxygen vacancies). For example, $\alpha$ may satisfy $0.001 \leq \alpha \leq 0.05$. When the material is oxygen-deficient, the electrochemical properties of the material may be improved, for example, resistance measurements may show improved conductivity in comparison to equivalent non-oxygen-deficient materials. As will be understood, the percentage values expressed herein are in atomic percent.

In a preferred aspect of Formula 2, the mixed niobium oxide, including the oxygen-deficient mixed niobium oxide, may be expressed by the formula $[M1]_x[M2]_{(1-x)}[Nb]_y[O]_z$, wherein:

M1 and M2 are different;

M1 represents one or more of Ti, Mg, V, Cr, W, Zr, Mo, Cu, Fe, Ga, Ge, Ca, K, Ni, Co, Al, Sn, Mn, Ce, Te, Se, Si, Sb, Y, La, Hf, Ta, Re, Zn, In, or Cd;

M2 represents one or more of Mg, V, Cr, W, Zr, Mo, Cu, Ga, Ge, Ca, K, Ni, Co, P, Al, Sn, Mn, Ce, Sb, Y, La, Hf, Ta, Zn, In, or Cd; and wherein x satisfies $0 < x < 0.5$;

y satisfies $0.5 \leq y \leq 49$ z satisfies $4 \leq z \leq 124$.

The mixed niobium oxide, including the oxygen-deficient mixed niobium oxide, may be selected from the group consisting of:

(i) $M1_xMo_{(1-x)}Nb_{12}O_{(33-33\ \alpha)}$
$M1_xW_{(1-x)}Nb_{12}O_{(33-33\alpha)}$
$M1_xV_{(1-x)}Nb_9O_{(25-25\ \alpha)}$
$M1_xZr_{(1-x)}Nb_{24}O_{(62-62\ \alpha)}$
$M1_xW_{(1-x)}Nb_{0.57}O_{(4.43-4.43\ \alpha)}$
$M1_xW_{(1-x)}Nb_{0.89}O_{(5.22-5.22\ \alpha)}$
$M1_xZn_{(1-x)}Nb_{17}O_{(43.5-43.5\ \alpha)}$
$M1_xCu_{(1-x)}Nb_{17}O_{(43.5-43.5\ \alpha)}$
$M1_xAl_{(1-x)}Nb_{11}O_{(29-29\ \alpha)}$
$M1_xGa_{(1-x)}Nb_{11}O_{(29-29\ \alpha)}$
$M1_xGe_{(1-x)}Nb_{18}O_{(47-47\ \alpha)}$
$M1_xW_{(1-x)}Nb_{1.125}O_{(5.81-5.81\ \alpha)}$
$M1_xW_{(1-x)}Nb_{3.2}O_{(11-11\ \alpha)}$
$M1_xAl_{(1-x)}Nb_{49}O_{(124-124\ \alpha)}$
$M1_xGa_{(1-x)}Nb_{49}O_{(124-124\ \alpha)}$; or (ii) $M1_xMo_{(1-x)}Nb_{12}O_{(33-33\ \alpha)}$
$M1_xW_{(1-x)}Nb_{12}O_{(33-33\ \alpha)}$
$M1_xV_{(1-x)}Nb_9O_{(25-25\ \alpha)}$
$M1_xZr_{(1-x)}Nb_{24}O_{(62-62\ \alpha)}$
$M1_xW_{(1-x)}Nb_{0.57}O_{(4.43-4.43\ \alpha)}$
$M1_xW_{(1-x)}Nb_{0.89}O_{(5.22-5.22\ \alpha)}$
$M1_xZn_{(1-x)}Nb_{17}O_{(43.5-43.5\ \alpha)}$
$M1_xAl_{(1-x)}Nb_{11}O_{(29-29\ \alpha)}$
$M1_xGe_{(1-x)}Nb_{18}O_{(47-47\ \alpha)}$; or preferably (iii) $M1_xMo_{(1-x)}Nb_{12}O_{(33-33\ \alpha)}$
$M1_xW_{(1-x)}Nb_{12}O_{(33-33\alpha)}$
$M1_xV_{(1-x)}Nb_9O_{(25-25\ \alpha)}$
$M1_xZr_{(1-x)}Nb_{24}O_{(62-62\ \alpha)}$
$M1_xW_{(1-x)}Nb_{0.57}O_{(4.43-4.43\ \alpha)}$
$M1_xW_{(1-x)}Nb_{0.89}O_{(5.22-5.22\ \alpha)}$ where M1 represents one or more of Ti, Mg, V, Cr, W, Zr, Mo, Cu, Fe, Ga, Ge, Ca, K, Ni, Co, Al, Sn, Mn, Ce, Te, Se, Si, Sb, Y, La, Hf, Ta, Re, Zn, In, or Cd; and wherein x satisfies $0 < x < 0.5$; and $\alpha$ satisfies $0 \leq \alpha \leq 0.05$.

Most preferably, the mixed niobium oxide, including the oxygen-deficient mixed niobium oxide, is selected from the group consisting of:

$M1_xMo_{(1-x)}Nb_{12}O_{(33-33\ \alpha)}$
$M1_xW_{(1-x)}Nb_{12}O_{(33-33\alpha)}$
$M1_xV_{(1-x)}Nb_9O_{(25-25\ \alpha)}$
$M1_xZr_{(1-x)}Nb_{24}O_{(62-62\ \alpha)}$
$M1_xW_{(1-x)}Nb_{0.57}O_{(4.43-4.43\ \alpha)}$
$M1_xW_{(1-x)}Nb_{0.89}O_{(5.22-5.22\ \alpha)}$ where M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, or Sb; and wherein x satisfies $0 < x < 0.5$; and $\alpha$ satisfies $0 \leq \alpha \leq 0.05$.

In a particularly preferred aspect, the mixed niobium oxide, including the oxygen-deficient mixed niobium oxide, is $M1_xMo_{(1-x)}Nb_{12}O_{(33-33\ \alpha)}$. In another particularly preferred aspect, the mixed niobium oxide, including the oxygen-deficient mixed niobium oxide, is $M1_xW_{(1-x)}Nb_{0.57}O_{(4.43-4.43\ \alpha)}$. In another particularly preferred aspect, the mixed niobium oxide, including the oxygen-deficient mixed niobium oxide, is $M1_xZn_{(1-x)}Nb_{17}O_{(43.5-43.5\alpha)}$. In another particularly preferred aspect, the mixed niobium oxide, including the oxygen-deficient mixed niobium oxide, is $M1_xAl_{(1-x)}Nb_{11}O_{(29-29\ \alpha)}$. x, M1, and $\alpha$ are as defined herein.

Preferably, in any of the above formulas M1 and M2 do not represent Nb.

The mixed niobium oxide, including the oxygen-deficient mixed niobium oxide, may be expressed by the formula $[M][Nb]_y[O]_{(z'-z'\alpha)}$ (Formula 3), wherein M consists of one of Mg, V, Cr, W, Zr, Mo, Cu, Ga, Ge, Ca, K, Ni, Co, Al, P, Sn, Mn, Ce, Sb, Y, La, Hf, Ta, Zn, In, or Cd;

y satisfies $0.5 \leq y \leq 49$;

z satisfies $4 \leq z \leq 124$; and wherein $\alpha$ satisfies $0 \leq \alpha \leq 0.05$ or $0 < \alpha \leq 0.05$.

M may consist of one of Mo, W, V, Zr, Al, P, Zn, Ga, Ge, Ta, Cr, Cu, K, Mg, Ni, or Hf; or M may consist of one of Mo, W, V, Zr, Al, P, Zn, Ga, or Ge; or preferably M may consist of one of Mo, W, Zr, Al, P, or Zn. Formula 3 may be selected from the group consisting of:

$MoNb_{12}O_{(33-33\ \alpha)}$
$WNb_{12}O_{(33-33\alpha)}$
$VNb_9O_{(25-25\ \alpha)}$
$PNb_9O_{(25-25\ \alpha)}$
$ZrNb_{24}O_{(62-62\ \alpha)}$
$W_7Nb_4O_{(31-31\ \alpha)}$
$W_9Nb_8O_{(47-47\ \alpha)}$
$Zn_2Nb_{34}O_{(87-87\ \alpha)}$
$Cu_2Nb_{34}O_{(87-87\ \alpha)}$
$AlNb_{11}O_{(29-29\ \alpha)}$
$GaNb_{11}O_{(29-29\ \alpha)}$ GeNb$_{18}$O$_{(47-47\ \alpha)}$
W$_{16}$Nb$_{18}$O$_{(93-93\ \alpha)}$
W$_5$Nb$_{16}$O$_{(55-55\ \alpha)}$
AlNb$_{49}$O$_{(124-124\ \alpha)}$
GaNb$_{49}$O$_{(124-124\ \alpha)}$
wherein α satisfies 0≤α≤0.05 or 0<α≤0.05.

Formula 3 may be selected from the group consisting of:
MoNb$_{12}$O$_{(33-33\ \alpha)}$
WNb$_{12}$O$_{(33-33\alpha)}$
VNb$_9$O$_{(25-25\ \alpha)}$
PNb$_9$O$_{(25-25\ \alpha)}$
ZrNb$_{24}$O$_{(62-62\ \alpha)}$
W$_7$Nb$_4$O$_{(31-31\ \alpha)}$
W$_9$Nb$_8$O$_{(47-47\ \alpha)}$
Zn$_2$Nb$_{34}$O$_{(87-87\ \alpha)}$
AlNb$_{11}$O$_{(29-29\ \alpha)}$
GeNb$_{18}$O$_{(47-47\ \alpha)}$
wherein α satisfies 0≤α≤0.05 or 0<α≤0.05.

Preferably, the mixed niobium oxide, including the oxygen-deficient mixed niobium oxide, may be expressed by the formula [M]$_x$[Nb]$_y$[O]$_{(z'-z'\alpha)}$ (Formula 3), selected from the group consisting of:
MoNb$_{12}$O$_{(33-33\ \alpha)}$
WNb$_{12}$O$_{(33-33\alpha)}$
VNb$_9$O$_{(25-25\ \alpha)}$
PNb$_9$O$_{(25-25\ \alpha)}$
ZrNb$_{24}$O$_{(62-62\ \alpha)}$
W$_7$Nb$_4$O$_{(31-31\ \alpha)}$
W$_9$Nb$_8$O$_{(47-47\ \alpha)}$
wherein α satisfies 0≤α≤0.05 or 0<α≤0.05.

In a particularly preferred aspect, the mixed niobium oxide, including the oxygen-deficient mixed niobium oxide, is PNb$_9$O$_{(25-25\ \alpha)}$ wherein α satisfies 0≤α≤0.05 or 0<α≤0.05.

When α>0 materials according to Formula 3 are oxygen-deficient analogues of known 'base' materials such as MoNb$_{12}$O$_{33}$, WNb$_{12}$O$_{33}$, ZrNb$_{24}$O$_{62}$, VNb$_9$O$_{25}$, PNb$_9$O$_{25}$, W$_7$Nb$_4$O$_{31}$, and W$_9$Nb$_8$O$_{47}$. The comments set out above in relation to Formula 2 specifying possible ranges for α when z is defined as z=(z'-z'α) also apply here to Formula 3. For example, α may satisfy 0.001≤α≤0.05.

The present inventors have found that by modifying materials such as MoNb$_{12}$O$_{33}$, WNb$_{12}$O$_{33}$, ZrNb$_{24}$O$_{62}$, VNb$_9$O$_{25}$, W$_7$Nb$_4$O$_{31}$, and W$_9$Nb$_8$O$_{47}$ by either incorporating multiple non-Nb cations to form mixed cation active electrode materials/complex oxide active electrode materials (as per Formula 2), and/or by creating an oxygen deficiency (as per Formula 3), the mixed niobium oxide may have improved electrochemical properties, and in particular improved electrochemical properties when used as an anode material.

The invention relates to mixed niobium oxides comprising oxygen vacancies. Oxygen vacancies may be formed in a mixed niobium oxide by the sub-valent substitution of a base material. For example, oxygen vacancies may be formed by substituting some of the Mo(6+) cations in MoNb$_{12}$O$_{33}$ with cations of a lower oxidation state, such as Ti(4+) and/or Zr(4+) cations. A specific example of this is the compound Ti$_{0.05}$Zr$_{0.05}$W$_{0.25}$Mo$_{0.65}$Nb$_{12}$O$_{33-\delta}$ which is derived from the base material MoNb$_{12}$O$_{33}$ and includes oxygen vacancies. Oxygen vacancies may also be formed by heating a mixed niobium oxide under reducing conditions. The amount of oxygen vacancies may be expressed relative to the total amount of oxygen in the base material, i.e. the amount of oxygen in the un-substituted material (e.g. MoNb$_{12}$O$_{33}$) or the material before heating under reducing conditions. The oxygen-deficient mixed niobium oxide comprises oxygen vacancies. The oxygen-deficient mixed niobium oxide may comprise up to 5 at % oxygen vacancies, or 0.1-4 at % oxygen vacancies, or 0.5-3 at % oxygen vacancies, relative to the total amount of oxygen in the base material A number of methods exist for determining whether oxygen vacancies are present in a material. For example, Thermogravimetric Analysis (TGA) may be performed to measure the mass change of a material when heated in air atmosphere. A material comprising oxygen vacancies can increase in mass when heated in air due to the material "re-oxidising" and the oxygen vacancies being filled by oxide anions. The magnitude of the mass increase may be used to quantify the concentration of oxygen vacancies in the material, on the assumption that the mass increase occurs entirely due to the oxygen vacancies being filled. It should be noted that a material comprising oxygen vacancies may show an initial mass increase as the oxygen vacancies are filled, followed by a mass decrease at higher temperatures if the material undergoes thermal decomposition. Moreover, there may be overlapping mass loss and mass gain processes, meaning that some materials comprising oxygen vacancies may not show a mass gain (and sometimes not a mass loss or gain) during TGA analysis.

Other methods of determining whether oxygen vacancies are present include electron paramagnetic resonance (EPR), X-ray photoelectron spectroscopy (XPS, e.g. of oxygen 1 s and/or of cations in a mixed oxide), X-ray absorption near-edge structure (XANES, e.g. of cations in a mixed metal oxide), and TEM (e.g. scanning TEM (STEM) equipped with high-angle annular darkfield (HAADF) and annular bright-field (ABF) detectors). The presence of oxygen vacancies can be qualitatively determined by assessing the colour of a material relative to a non-oxygen-deficient sample of the same material. For example, stoichiometric MoNb$_{12}$O$_{33}$ has a white, off-white, or yellow colour whereas oxygen-deficient MoNb$_{12}$O$_{33-\delta}$ has a purple colour. The presence of vacancies can also be inferred from the properties, e.g. electrical conductivity, of a stoichiometric material compared to those of an oxygen-deficient material.

The method of the invention uses a carbon precursor comprising polyaromatic sp$^2$ carbon. The carbon precursor may comprise a mixture of different types of polyaromatic sp$^2$ carbon. The carbon precursor is selected from pitch carbons, graphene oxide, and mixtures thereof. It has been found that use of these carbon precursors provides an active electrode material with improved properties compared to use of other types of carbon precursor, as shown by the examples. Most preferably, the carbon precursor is selected from pitch carbons. The pitch carbons may be selected from coal tar pitch, petroleum pitch, mesophase pitch, wood tar pitch, isotropic pitch, bitumen, and mixtures thereof. For example, the carbon precursor may be petroleum pitch.

Pitch carbon is a mixture of aromatic hydrocarbons of different molecular weights. Pitch carbon is a low cost by-product from petroleum refineries and is widely available. The use of pitch carbon is advantageous because pitch has a low content of oxygen. Therefore, in combination with heating the intermediate material under reducing conditions, the use of pitch favours the formation of oxygen vacancies in the mixed niobium oxide.

The pitch carbon may have a softening point in the range of 50-400° C., preferably 80-300° C., most preferably 100-270° C. Pitch with an appropriate softening point is more easy to combine with the mixed niobium oxide to form the intermediate material. Softening points are typically reported by commercial pitch suppliers. Softening points in the range of 50-180° C. may be determined by ASTM D3104-14a(2018). Softening points above 80° C. may be determined by ASTM D2319/D2319M-20, which gives comparable results to ASTM D3104-14a(2018). For example, softening points in the range of 50-80° C. may be determined by ASTM D3104-14a(2018) and softening points above 80° C. may be determined by ASTM D2319/D2319M-20.

Other carbon precursors typically contain substantial amounts of oxygen. For example, carbohydrates such as glucose and sucrose are often used as carbon precursors. These have the empirical formula $C_m(H_2O)$, and thus contain a significant amount of covalently-bonded oxygen (e.g. sucrose has the formula $C_{12}H_{22}O_{11}$ and is about 42 wt % oxygen). The pyrolysis of carbon precursors which contain substantial amounts of oxygen is believed to prevent or inhibit reduction of a mixed niobium oxide, or even lead to oxidation, meaning that oxygen vacancies may not be introduced into the mixed niobium oxide. Accordingly, the carbon precursor may have an oxygen content of less than 10 wt %, preferably less than 5 wt %.

The carbon precursor may be substantially free of $sp^3$ carbon. For example, the carbon precursor may comprise less than 10 wt % sources of $sp^3$ carbon, preferably less than 5 wt % sources of $sp^3$ carbon. Carbohydrates are sources of $sp^3$ carbon. The carbon precursor may be free of carbohydrates. It will be understood that some carbon precursors used in the invention may contain impurities of $sp^3$ carbon, for example up to 3 wt %.

The active electrode material comprises a carbon coating comprising polyaromatic $sp^2$ carbon. Such a coating is formed by pyrolysing a carbon precursor comprising polyaromatic $sp^2$ carbon since the $sp^2$ hybridisation is largely retained during pyrolysis. Typically, pyrolysis of a polyaromatic $sp^2$ carbon precursor under reducing conditions results in the domains of $sp^2$ aromatic carbon increasing in size. Accordingly, the presence of a carbon coating comprising polyaromatic $sp^2$ may be established via knowledge of the precursor used to make the coating. The carbon coating may be defined as a carbon coating formed from pyrolysis of a carbon precursor comprising polyaromatic $sp^2$ carbon. Optionally, the carbon coating may comprise niobium carbide.

The presence of a carbon coating comprising polyaromatic $sp^2$ carbon may also be established by routine spectroscopic techniques. For instance, Raman spectroscopy provides characteristic peaks (most observed in the region 1,000-3,500 $cm^{-1}$) which can be used to identify the presence of different forms of carbon. A highly crystalline sample of $sp^3$ carbon (e.g. diamond) provides a narrow characteristic peak at ~1332 $cm^{-1}$. Polyaromatic $sp^2$ carbon typically provides characteristic D, G, and 2D peaks. The relative intensity of D and G peaks ($I_D/I_G$) can provide information on the relative proportion of $sp^2$ to $sp^3$ carbon. The active electrode material may have an $I_D/I_G$ ratio as observed by Raman spectroscopy within the range of 0.85-1.15, or 0.90-1.10, or 0.95-1.05.

X-ray diffraction may also be used to provide information on the type of carbon coating. For example, an XRD pattern of a mixed niobium oxide with a carbon coating may be compared to an XRD pattern of the uncoated mixed niobium oxide and/or to an XRD pattern of a pyrolysed sample of the carbon precursor used to make the carbon coating.

The carbon coating may be semi-crystalline. For example, the carbon coating may provide a peak in an XRD pattern of the active electrode material centred at 2θ of about 26° with a width (full width at half maximum) of at least 0.20°, or at least 0.25°, or at least 0.30°.

The step of providing a mixed niobium oxide may include synthesising a mixed niobium oxide, or obtaining a mixed niobium oxide from a supplier. The mixed niobium oxide may be synthesised by conventional ceramic techniques. For example, the mixed niobium oxide may be made by solid-state synthesis or by sol-gel synthesis. It may also be synthesised by hydrothermal, solvothermal, or co-precipitation steps. In a typical synthesis, steps may include grinding, de-agglomeration, milling, heat treatments in different atmospheres, filtration, vacuum drying, spray drying.

The mixed niobium oxide may be synthesised by a method comprising steps of: providing one or more precursor materials; mixing said precursor materials to form a precursor material mixture; and heat treating the precursor material mixture in a temperature range from 400° C.-1350° C. to form the active electrode material.

The precursor materials may include one or more metal oxides, metal hydroxides, metal salts or oxalates. For example, the precursor materials may include one or more metal oxides of different oxidation states and/or of different crystal structure. Examples of suitable metal oxide precursor materials include but are not limited to: $Nb_2O_5$, $Nb(OH)_5$, $WO_3$, $ZrO_2$, $TiO_2$, $MoO_3$, $NH_4H_2PO_4$, $NbO_2$, $V_2O_5$, $ZrO_2$, and MgO. However, the precursor materials may not comprise a metal oxide, or may comprise ion sources other than oxides. For example, the precursor materials may comprise metal salts (e.g. $NO_3^-$, $SO_3^-$) or other compounds (e.g. oxalates).

Some or all of the precursor materials may be particulate materials. Where they are particulate materials, preferably they have a $D_{50}$ particle diameter of less than 20 μm in diameter, for example from 10 nm to 20 μm. Providing particulate materials with such a particle diameter can help to promote more intimate mixing of precursor materials, thereby resulting in more efficient solid-state reaction during the heat treatment step. However, it is not essential that the precursor materials have an initial particle size of <20 μm in diameter, as the particle size of the one or more precursor materials may be mechanically reduced during the step of mixing said precursor materials to form a precursor material mixture.

The step of mixing/milling the precursor materials to form a precursor material mixture may be performed by a process selected from (but not limited to): dry or wet planetary ball milling, rolling ball milling, high shear milling, air jet milling, and/or impact milling. The force used for mixing/milling may depend on the morphology of the precursor materials. For example, where some or all of the precursor materials have larger particle sizes (e.g. a $D_{50}$ particle diameter of greater than 20 μm), the milling force may be selected to reduce the particle diameter of the precursor materials such that the such that the particle diameter of the precursor material mixture is reduced to 20 μm in diameter or lower. When the particle diameter of particles in the precursor material mixture is 20 μm or less, this can promote a more efficient solid-state reaction of the precursor materials in the precursor material mixture during the heat treatment step.

The step of heat treating the precursor material mixture may be performed for a time of from 1 hour to 24 hours, more preferably from 3 hours to 14 hours. For example, the heat treatment step may be performed for 1 hour or more, 2 hours or more, 3 hours or more, 6 hours or more, or 12 hours or more. The heat treatment step may be performed for 24 hours or less, 18 hours or less, 14 hours or less, or 12 hours or less.

In some methods it may be beneficial to perform a two-step heat treatment. For example, the precursor material mixture may be heated at a first temperature for a first length of time, follow by heating at a second temperature for a second length of time. Preferably the second temperature is higher than the first temperature. Performing such a two-step heat treatment may assist the solid state reaction to form the desired crystal structure.

The step of heat treating the precursor material mixture may be performed in a gaseous atmosphere. Suitable gaseous atmospheres include: air, $N_2$, Ar, He, $CO_2$, CO, $O_2$, $H_2$, and mixtures thereof. The gaseous atmosphere may be a reducing atmosphere. Where it is desired to make an oxygen-deficient material, preferably the step of heat treating the precursor material mixture is performed in a reducing atmosphere.

The method may include one or more post-processing steps after formation of the mixed niobium oxide. In some cases, the method may include a post-processing step of heat treating the mixed niobium oxide, sometimes referred to as 'annealing'. This post-processing heat treatment step may be performed in a different gaseous atmosphere to the step of heat treating the precursor material mixture to form the mixed niobium oxide. The post-processing heat treatment step may be performed in an inert or reducing gaseous atmosphere. Such a post-processing heat treatment step may be performed at temperatures of above 500° C., for example at about 900° C. Inclusion of a post-processing heat treatment step may be beneficial to e.g. form deficiencies or defects in the mixed niobium oxide, for example to form oxygen deficiencies.

The step of combining the mixed niobium oxide with the carbon precursor to form the intermediate material may comprise milling, preferably high energy milling. Alternatively or in addition, the step may comprise mixing the mixed niobium oxide with the carbon precursor in a solvent, such as ethanol or THF. These represent efficient methods of ensuring uniform mixing of the mixed niobium oxide with the carbon precursor. The solvent may then be evaporated prior to a heat treatment in inert or reducing conditions, such as by oven drying, vacuum drying, or spray drying.

The intermediate material may comprise the carbon precursor in an amount of up to 25 wt %, or 0.1-15 wt %, or 0.2-8 wt %, based on the total weight of the mixed niobium oxide and the carbon precursor. The carbon coating on the active electrode material may be present in an amount of up to 10 wt %, or 0.05-5 wt %, or 0.1-3 wt %, based on the total weight of the active electrode material. These amounts of the carbon precursor and/or carbon coating provide a good balance between improving the electronic conductivity by the carbon coating without overly reducing the capacity of the active electrode material by overly reducing the proportion of the mixed niobium oxide. The mass of carbon precursor lost during pyrolysis may be in the range of 30-70 wt %.

The step of heating the intermediate material under reducing conditions may be performed at a temperature in the range of 400-1,200° C., or 500-1,100° C., or 600-900° C. The step of heating the intermediate material under reducing conditions may be performed for a duration within the range of 30 minutes to 12 hours, 1-9 hours, or 2-6 hours.

The step of heating the intermediate material under reducing conditions may be performed under an inert gas such as nitrogen, helium, argon; or may be performed under a mixture of an inert gas and hydrogen; or may be performed under vacuum.

The method of the invention may include a step of introducing oxygen vacancies into the mixed niobium oxide before it is combined with the carbon precursor. That is, the method may include the steps of: providing a mixed niobium oxide; heating the mixed niobium oxide under reducing conditions to introduce oxygen vacancies into the mixed niobium oxide, thereby forming an oxygen-deficient mixed niobium oxide; combining the oxygen-deficient mixed niobium oxide with a carbon precursor comprising polyaromatic $sp^2$ carbon selected from pitch carbons, graphene oxide, and mixtures thereof to form an intermediate material; and heating the intermediate material under reducing conditions to pyrolyse the carbon precursor forming a carbon coating on the oxygen-deficient mixed niobium oxide and introducing further oxygen vacancies into the oxygen-deficient mixed niobium oxide, thereby forming the active electrode material. Advantageously, this method results in a mixed niobium oxide with an increased number of oxygen vacancies, further improving the properties of the active electrode material.

The step of heating the mixed niobium oxide under reducing conditions may be performed at a temperature in the range of 400-1,350° C., or 500-1,100° C., or 600-900° C. The step of heating the mixed niobium oxide under reducing conditions may be performed for a duration within the range of 30 minutes to 12 hours, 1-9 hours, or 2-6 hours.

The step of heating the mixed niobium oxide under reducing conditions may be performed under an inert gas such as nitrogen, helium, argon; or may be performed under a mixture of an inert gas and hydrogen; or may be performed under vacuum.

The mixed niobium oxide is preferably in particulate form. The mixed niobium oxide may have a $D_{50}$ particle diameter in the range of 0.1-100 μm, or 0.5-50 μm, or 1-30 μm. These particle sizes are advantageous because they are easy to process and provide a product with an advantageous particle size. Moreover, these particle sizes avoid the need to use complex and/or expensive methods for providing nanosized particles. Nanosized particles (e.g. particles having a D50 particle diameter of 100 nm or less) are typically more complex to synthesise and require additional safety considerations.

The mixed niobium oxide may have a $D_{10}$ particle diameter of at least 0.05 μm, or at least 0.1 μm, or at least 0.5 μm. By maintaining a $D_{10}$ particle diameter within these ranges, the potential for agglomeration of the particles is reduced, meaning that the carbon precursor is more able to be evenly distributed across the surface of the mixed niobium oxide.

The mixed niobium oxide may have a $D_{90}$ particle diameter of no more than 200 μm, no more than 100 μm, or no more than 50 μm. By maintaining a $D_{90}$ particle diameter within these ranges, a product with a desirable $D_{90}$ particle diameter may be readily produced.

The method may include a step of milling and/or classifying the mixed niobium oxide (e.g. impact milling or jet milling) to provide a mixed niobium oxide with any of the particle size parameters given above.

The active electrode material is preferably in particulate form. The active electrode material may have a $D_{50}$ particle diameter in the range of 0.1-100 μm, or 0.5-50 μm, or 1-15 μm. These particle sizes are advantageous because they are easier to process than nanosized particles when forming an electrode comprising the active electrode material, and avoid the need for safety considerations which may be required when using nanosized particles.

The active electrode material may have a $D_{10}$ particle diameter of at least 0.05 μm, or at least 0.1 μm, or at least 0.5 µm. By maintaining the D90 particle diameter within these ranges, the potential for undesirable agglomeration of sub-micron sized particles is reduced, resulting in improved dispersibility of the particulate material and improved capacity retention.

The active electrode material may have a $D_{90}$ particle diameter of no more than 200 µm, 100 µm, or 50 µm. $D_{90}$ particle diameters within these ranges are advantageous because large particles may result in non-uniform forming packing of the particles in electrode layers, thus disrupting the formation of dense electrode layers.

The method may include a step of milling and/or classifying the active electrode material (e.g. impact milling or jet milling) to provide an active electrode material with any of the particle size parameters given above.

The term "particle diameter" refers to the equivalent spherical diameter (esd), i.e. the diameter of a sphere having the same volume as a given particle, where the particle volume is understood to include the volume of any intra-particle pores. The terms "Dn" and "Dn particle diameter" refer to the diameter below which n % by volume of the particle population is found, i.e. the terms "$D_{50}$" and "$D_{50}$ particle diameter" refer to the volume-based median particle diameter below which 50% by volume of the particle population is found. Where a material comprises primary crystallites agglomerated into secondary particles, it will be understood that the particle diameter refers to the diameter of the secondary particles. Particle diameters can be determined by laser diffraction. For example, particle diameters can be determined in accordance with ISO 13320:2009.

The active electrode material may have a BET surface area in the range of 0.1-100 m²/g, or 0.5-50 m²/g, or 1-20 m²/g. In general, a low BET surface area is preferred in order to minimise the reaction of the active electrode material with the electrolyte, e.g. minimising the formation of solid electrolyte interphase (SEI) layers during the first charge-discharge cycle of an electrode comprising the material. However, a BET surface area which is too low results in unacceptably low charging rate and capacity due to the inaccessibility of the bulk of the active electrode material to metal ions in the surrounding electrolyte.

The term "BET surface area" refers to the surface area per unit mass calculated from a measurement of the physical adsorption of gas molecules on a solid surface, using the Brunauer-Emmett-Teller theory. For example, BET surface areas can be determined in accordance with ISO 9277:2010.

The specific capacity/reversible delithiation capacity of the active electrode materials may be 150 mAh/g or more, 175 mAh/g or more, up to about 200 mAh/g or more. Here, specific capacity is defined as that measured in the 2nd cycle of a half cell galvanostatic cycling test at a rate of 0.1 C with a voltage window of 1.1-3.0V or 1.0-3.0V vs Li/Li+. It may be advantageous to provide materials having a high specific capacity, as this can provide improved performance in an electrochemical device comprising the active electrode material.

When formulated or coated as an electrode (optionally with conductive carbon additive and binder materials), the sheet resistance of the active electrode materials may be 750 Ω per square or less, more preferably 650Ω per square or less. Sheet resistance can be a useful proxy measurement of the electronic conductivity of such materials. It may be advantageous to provide materials having a suitably low sheet resistance, as this can provide improved performance in an electrochemical device comprising the active electrode material.

The direct current internal resistance (DCIR) and resultant area specific impedance (ASI) of the active electrode materials when measured in a Li-ion half coin cell with the described electrode may be 65 Ω·cm² or less (for ASI). Preferably the ASI is less than 50 Ω·cm². It may be advantageous to provide materials having a suitably low DCIR and/or ASI, as this can provide improved performance in an electrochemical device comprising the active electrode material. However, further improvements in DCIR/ASI values may be where the active electrode material is incorporated in a commercial power cell with a cathode, with an electrode which has been calendared and prepared in a typical known manner. When measured in such an arrangement in a coin cell, the inventors theorise that the ASI may be as low as e.g. 25 Ω·cm² or less.

The active electrode material may have a lithium diffusion rate of greater than $10^{-14}$ cm² s⁻¹. It may be advantageous to provide materials having a suitably high lithium diffusion rate, as this can provide improved performance in an electrochemical device comprising the active electrode material.

The active electrode material may have an electrode density of 2.5 g/cm³ or more after calendaring. For example, electrode densities of up to 3.0 g/cm³ or more after calendaring have been achieved. It may be advantageous to provide materials having such an electrode density, as this can provide improved performance in an electrochemical device comprising the active electrode material. Specifically, when the electrode density is high, high volumetric capacities can be achieved, as gravimetric capacity×electrode density×active electrode material fraction=volumetric capacity.

Initial coulombic efficiency has been measured as the difference in the lithiation and de-lithiation capacity on the 1st charge/discharge cycle at C/10 in a half-cell. The initial coulombic efficiency of the active electrode material may be greater than 88%, or greater than 90%, or greater than 94%. It may be advantageous to provide materials having a suitably high initial coulombic efficiency, as this can provide improved performance in an electrochemical device comprising the active electrode material.

In an alternative definition of the first aspect of the invention, the invention also provides a method of making an active electrode material, the method comprising: providing an oxide having a Wadsley-Roth or Tetragonal Tungsten Bronze crystal structure; combining the oxide with a carbon precursor to form an intermediate material, wherein the carbon precursor comprises polyaromatic sp² carbon and is selected from pitch carbons, graphene oxide, and mixtures thereof; and heating the intermediate material under reducing conditions to pyrolyse the carbon precursor forming a carbon coating on the oxide and introducing oxygen vacancies into the oxide, thereby forming the active electrode material.

The invention also provides an active electrode material obtainable from the method of the first aspect of the invention.

In an alternative definition of the third aspect of the invention, the invention provides an active electrode material formed of an oxygen-deficient oxide having a Wadsley-Roth or Tetragonal Tungsten Bronze crystal structure, wherein the oxygen-deficient oxide comprises a carbon coating comprising polyaromatic sp² carbon.

The invention also provides a composition comprising the active electrode material and at least one other component, optionally wherein the at least one other component is selected from a binder, a solvent, a conductive additive, an additional active electrode material, and mixtures thereof.

Such a composition is useful for preparing an electrode, e.g. an anode for a lithium-ion battery.

The invention also provides an electrode comprising the active electrode material in electrical contact with a current collector. The electrode may form part of a cell. The electrode may form an anode as part of a lithium-ion battery.

The invention also provides the use of the active electrode material in an anode for a metal-ion battery, optionally wherein the metal-ion battery is a lithium-ion battery.

The invention also provides the use of a carbon precursor comprising polyaromatic $sp^2$ carbon selected from pitch carbons, graphene oxide, and mixtures thereof to improve the properties of a mixed niobium oxide for use as an active electrode material. The invention also provides the use of a carbon precursor comprising polyaromatic $sp^2$ carbon selected from pitch carbons, graphene oxide, and mixtures thereof to improve the properties of an oxide having a Wadsley-Roth or Tetragonal Tungsten Bronze crystal structure for use as an active electrode material. For example, the carbon precursor comprising polyaromatic $sp^2$ carbon selected from pitch carbons, graphene oxide, and mixtures thereof may be used to improve the initial coulombic efficiency of the oxide. The carbon precursor comprising polyaromatic $sp^2$ carbon selected from pitch carbons, graphene oxide, and mixtures thereof may be used to improve the specific capacity of the oxide.

EXAMPLES

The base Wadsley-Roth and Bronze materials were synthesised by a solid-state route. In a first step precursor materials (e.g. $Nb_2O_5$, $Nb(OH)_5$, $NH_4(C_2O_4)_2NbO$, $WO_3$, $ZrO_2$, $TiO_2$, $MoO_3$, $NH_4H_2PO_4$, $Al_2O_3$, $Fe_2O_3$, etc.) were mixed in stoichiometric proportions (200 g total) and ball-milled at 550 rpm with a ball to powder ratio of 10:1 for 6 h. The resulting powders were heat treated in an alumina crucible in a muffle furnace in air at $T_{1a}$=800-1350° C. for 12 h, providing the desired Wadsley-Roth or Bronze phase. An additional heat treatment step was also applied in some cases under a $N_2$ atmosphere at $T_{1b}$=800-1350° C. for 1-5 h to result in minor oxygen deficiencies in the base crystal structure prior to carbon coating.

This (98 g) was then combined with polyaromatic $sp^2$ carbon (2 g) (petroleum pitch, specifically petroleum pitch ZL 118M available from Rain Carbon which has a softening point of 118° C.) by high energy impact mixing/milling. For other carbon materials used, the same procedure for carbon inclusion was followed. Petroleum pitch ZL 250M which has a softening point of 250° C. (Sample E3) was sourced from Rain Carbon, carboxymethyl cellulose (CMC) and sucrose were sourced from Sigma Aldrich, and multilayer graphene oxide (GO) was sourced from SAT Nano Technology Material Co. Ltd. The mixture was heat treated in a furnace under reducing conditions (e.g. under $N_2$) at $T_2$=600-1100° C. for 5 h to provide the final material, which was a free-flowing black powder. A final de-agglomeration step was utilised by impact milling or jet milling to adjust to the desired particle size distribution. Specifically, the material was de-agglomerated by impact milling at 20,000 RPM for 10 seconds.

Sample 1 was synthesised as above with $T_{1a}$=900° C., $T_{1b}$=900° C. for 5 h. Sample 2 was synthesised from Sample 1 as above with 2 wt % pitch and $T_2$=900° C. for 5 h. Sample 3 was synthesised as above with $T_{1a}$=1100° C., with no heat treatment in an inert atmosphere. Sample 4a was synthesised from Sample 3 as above with 2 wt % pitch and $T_2$=700° C. for 1 h; and Sample 4b with 2 wt % pitch and $T_2$=800° C. and for 3 h. Sample 6 was synthesised as above with an additional hold at 380° C. for 6 h to decompose the $NH_4H_2PO_4$, followed by heat treatment at $T_{1a}$=1200° C., with no heat treatment in inert atmosphere. Sample 7 was synthesised from Sample 6 with 2 wt % pitch and $T_2$=900° C. for 5 h. Sample E1 was synthesised with $T_{1a}$=1300° C. Samples E2, E3 were synthesised from Sample E1 with petroleum pitch ZL118M and ZL250M respectively, with $T_2$=900° C. for 4 h. Comparative Samples E4, E5 were synthesised from Sample E1 with CMC and sucrose respectively, with $T_2$=600° C. for 4 h. Sample E6 was synthesised from Sample 1 with GO, with $T_2$=900° C. for 4 h.

A comparative Sample 5 with a different type of carbon coating was prepared from Sample 1 as follows. Sample 1 (50 g) was impact milled and then combined with de-ionised water (0.5 L), carbohydrate (3.13 g trehalose), and ionic surfactant (0.27 g ammonium oleate) and mixed with a high shear homogeniser at 4000 rpm for 1 h. The slurry was then spray dried using a Buchi B-290 laboratory spray dryer at a sample flow rate of 0.25 L h$^{-1}$, inlet T=220° C., outlet T=110° C. The sample was collected by a cyclonic separator. The sample was heat treated in a muffle furnace in an inert $N_2$ atmosphere at 600° C. for 5 h to provide the final material as a black free-flowing powder with no additional milling steps.

TABLE 1

A summary of the materials synthesised. Particle size distribution has been evaluated by dry powder laser diffraction.

| Sample | Material | D10 (μm) | D50 (μm) | D90 (μm) |
|---|---|---|---|---|
| 1* | $Ti_{0.05}Zr_{0.05}W_{0.25}Mo_{0.65}Nb_{12}O_{33-\delta}$ | 1.4 | 4.4 | 9.6 |
| 2 | $Ti_{0.05}Zr_{0.05}W_{0.25}Mo_{0.65}Nb_{12}O_{33-\delta}$ + C | 2.7 | 6.2 | 13.9 |
| 3* | $Ti_{0.35}W_{6.65}Nb_4O_{31}$ | 1.5 | 4.9 | 10.6 |
| 4a | $Ti_{0.35}W_{6.65}Nb_4O_{31-\delta}$ + C (700° C.) | 1.7 | 4.4 | 8.6 |
| 4b | $Ti_{0.35}W_{6.65}Nb_4O_{31-\delta}$ + C (800° C.) | 1.1 | 3.5 | 6.9 |
| 5** | $Ti_{0.05}Zr_{0.05}W_{0.25}Mo_{0.65}Nb_{12}O_{33-\delta}$ + C | 4.4 | 7.5 | 13.4 |
| 6* | $PNb_9O_{25}$ | 1.3 | 2.9 | 4.9 |
| 7 | $PNb_9O_{25-\delta}$ + C | 1.0 | 3.0 | 5.9 |

*Comparative sample - no carbon coating
**Comparative sample - carbon coating derived from carbohydrate TABLE 1a A summary of the materials synthesised. Particle size distribution has been evaluated by dry powder laser diffraction. Pitch 118 and 250 have softening points of 118° C. and 250° C. respectively.

| Sample | Material | D10 (μm) | D50 (μm) | D90 (μm) |
|---|---|---|---|---|
| E1* | $Fe_{0.05}Al_{0.95}Nb_{11}O_{29}$ | 4.3 | 7.7 | 13.9 |
| E2 | $Fe_{0.05}Al_{0.95}Nb_{11}O_{29-\delta}$/Pitch 118 | 4.5 | 7.5 | 12.5 |
| E3 | $Fe_{0.05}Al_{0.95}Nb_{11}O_{29-\delta}$/Pitch 250 | 4.1 | 6.7 | 10.7 |
| E4** | $Fe_{0.05}Al_{0.95}Nb_{11}O_{29-\delta}$/CMC | 4.2 | 6.8 | 11.1 |
| E5** | $Fe_{0.05}Al_{0.95}Nb_{11}O_{29-\delta}$/Sucrose | 4.4 | 7.2 | 11.6 |
| E6 | $Ti_{0.05}Zr_{0.05}W_{0.25}Mo_{0.65}Nb_{12}O_{33-\delta}$/GO | 2.2 | 5.0 | 10.3 |

TABLE 2

A summary of BET surface area analysis carried out on some samples.

| Sample | BET Surface Area [m$^2$ g$^{-1}$] |
|---|---|
| 1* | 1.83 |
| 2 | 1.55 |

TABLE 2-continued

A summary of BET surface area analysis
carried out on some samples.

| Sample | BET Surface Area [m² g⁻¹] |
|---|---|
| 3* | 1.57 |
| 4a | 7.89 |
| 5** | 12.63 |

*Comparative sample - no carbon coating
**Comparative sample - carbon coating derived from carbohydrate Materials Characterisation The phase purity of samples was analysed using a Rigaku Miniflex powder X-ray diffractometer in 2θ range (20-70°) at 1°/min scan rate.

Figure 3:
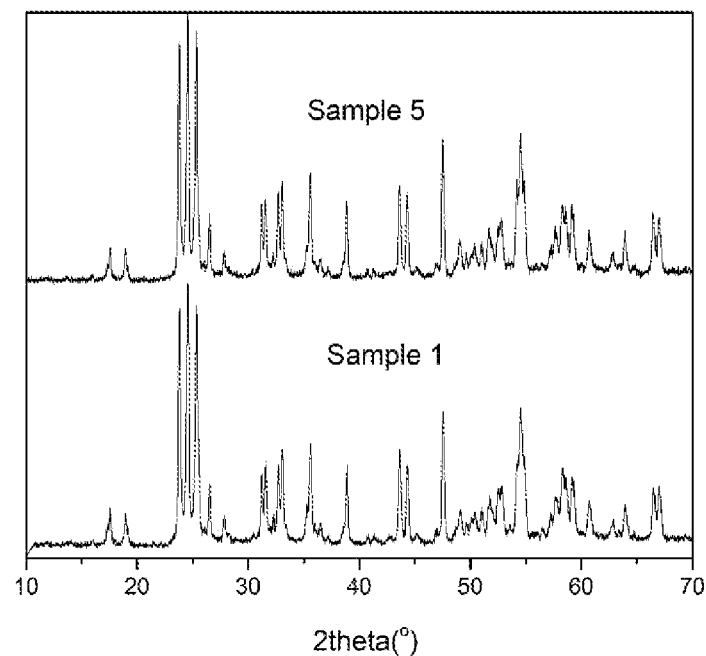
FIG. 3: Powder XRD of Sample 1 and Sample 5.

FIG. 1 shows the measured XRD diffraction patterns for samples 1 and 2. Diffraction patterns have peaks at the same locations (within instrument error, that is 0.1°), and match JCPDS crystallography database entry database JCPDS 73-1322, which corresponds to $MoNb_{12}O_{33}$. Sample 2 has some changes to its peaks due to the introduced oxygen-deficiency beginning to induce minor crystallographic distortions due to vacancy defects, and additional peaks relating to the carbon coating at ~26° and ~40°. There is no amorphous background noise and the peaks are sharp and intense. FIG. 3 shows the measured XRD diffraction pattern for sample 5 versus that of sample 1. This means that all samples are phase-pure and crystalline, with crystallite size ~200 nm according to the Scherrer equation and crystal structure matching $MoNb_{12}O_{33}$. This confirms the presence of a Wadsley-Roth crystal structure. The XRD pattern for sample 5 does not show the additional peaks relating to the carbon coating at ~26° and ~40° which were observed in the pattern for sample 2. Figure E2 shows the XRD diffraction pattern for Sample E6.

Figure 2:
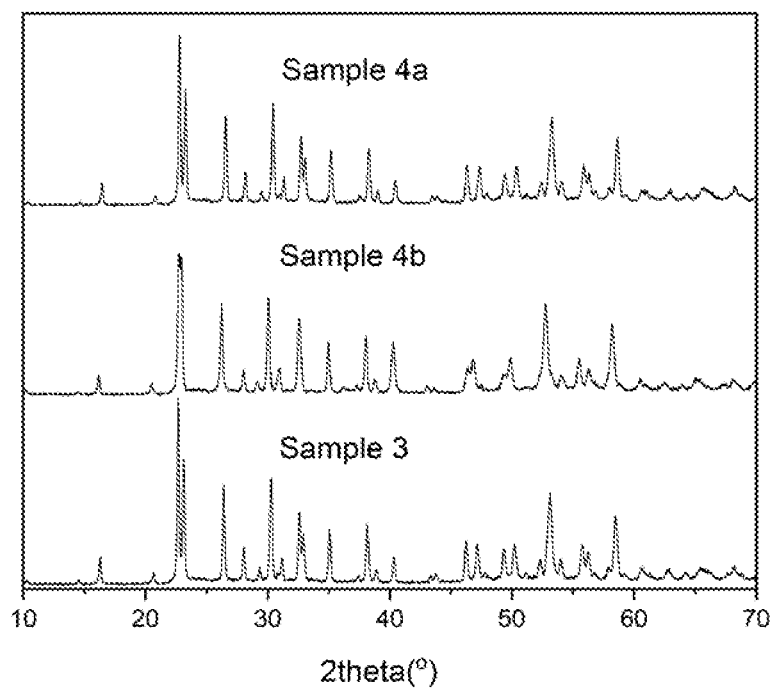
FIG. 2: Powder XRD of Sample 3, Sample 4a, Sample 4b. Peak changes are observed upon higher degrees of oxygen deficiency being introduced.

FIG. 2 shows the measured XRD diffraction patterns for samples 3, 4a, and 4b. Diffraction patterns have peaks at the same locations (within instrument error, that is 0.1°), and match JCPDS crystallography database entry database JCPDS 00-020-1320, which corresponds to $W_7Nb_4O_{31}$. There is no amorphous background noise and the peaks are sharp and intense. This means that all samples are phase-pure and crystalline, with crystallite size ~200 nm according to the Scherrer equation and crystal structure matching $W_7Nb_4O_{31}$. This confirms the presence of a Tetragonal Tungsten Bronze crystal structure.

Figure 4:
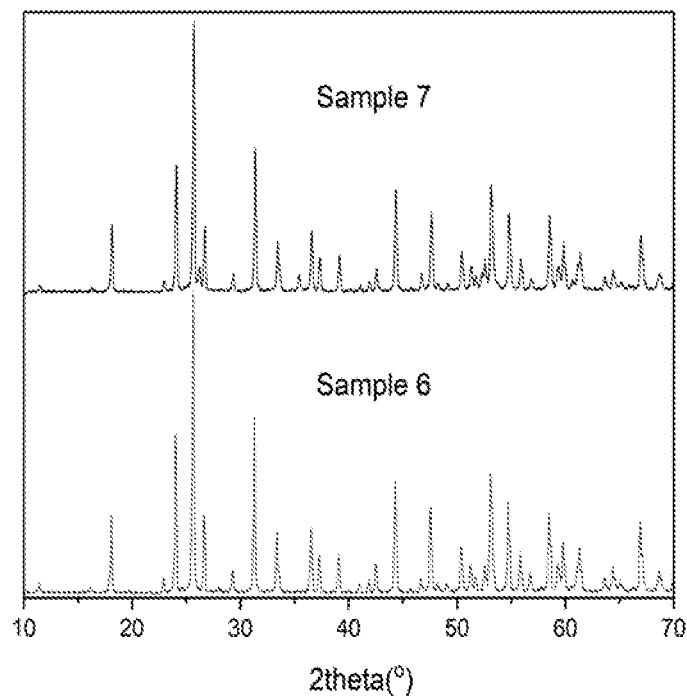
FIG. 4: Powder XRD of Sample 6 and Sample 7. In Sample 7 some peak changes and additional peaks can be observed, due to the induced oxygen deficiency and the presence of the carbon coating.
Figure 5:
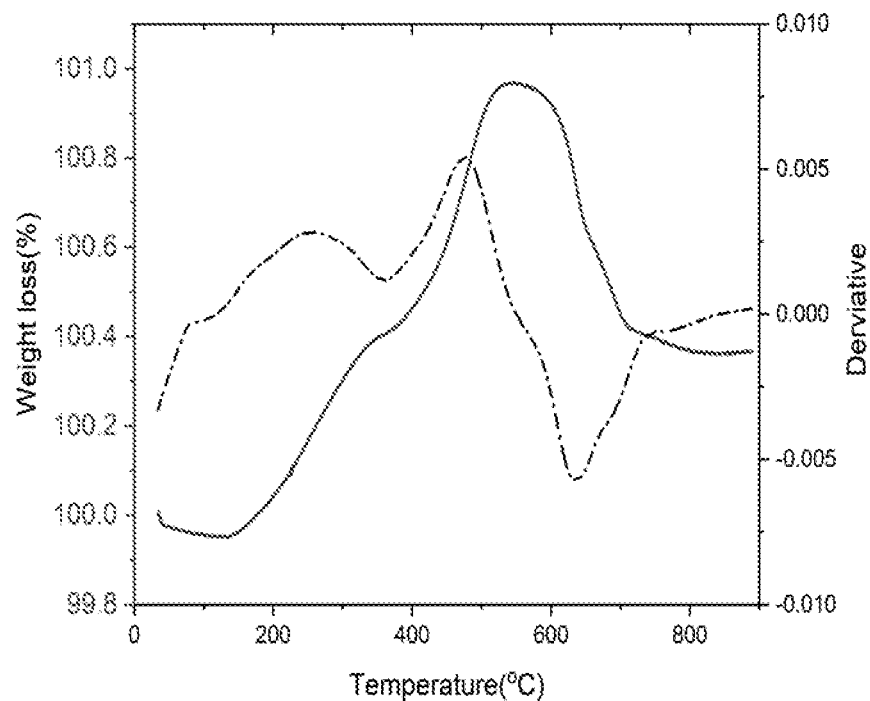
FIG. 5: TGA of Sample 2 in air, showing both the absolute weight loss and the differential.
Figure 6:
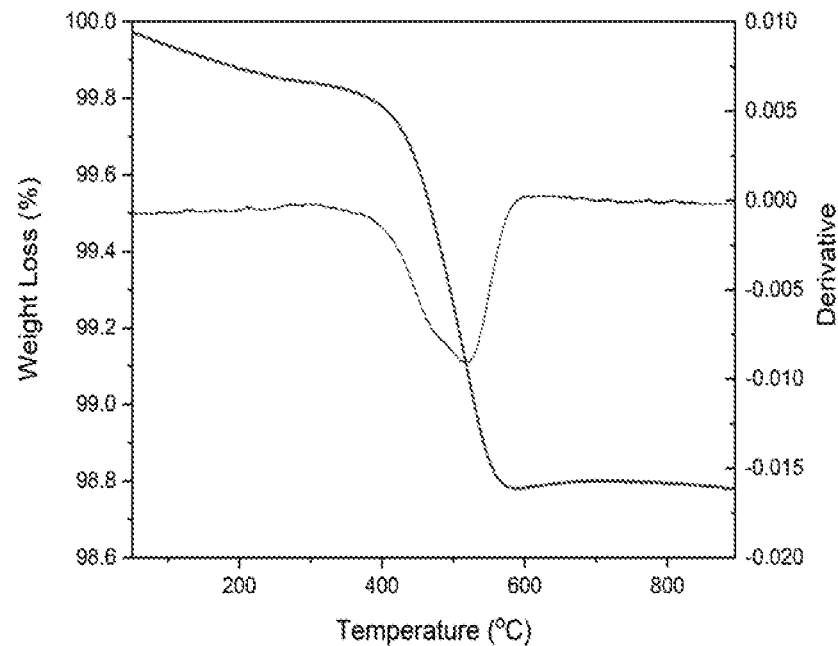
FIG. 6: TGA of Sample 4a in air, showing the absolute weight loss and the differential.
Figure 7:
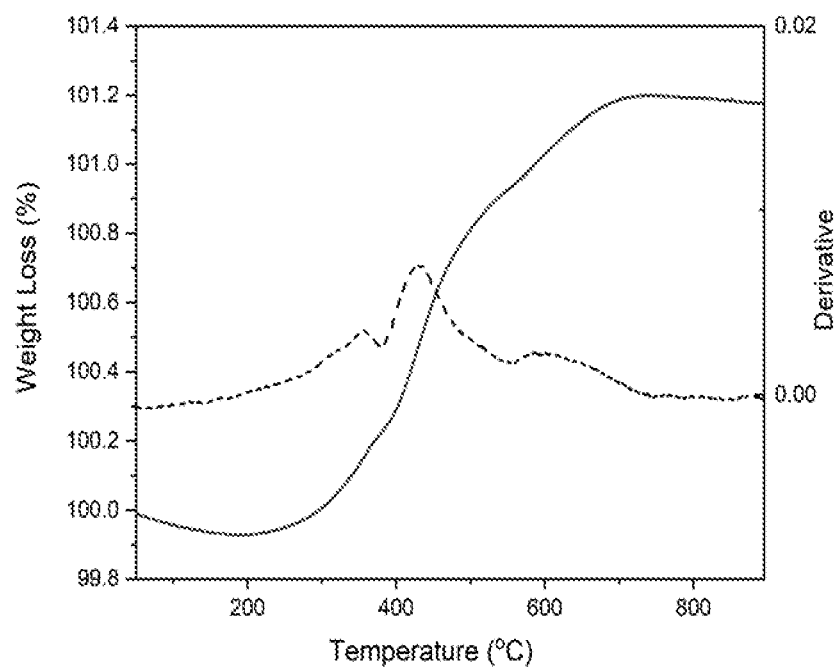
FIG. 7: TGA of Sample 4b in air, showing the absolute weight loss and the differential.
Figure 8:
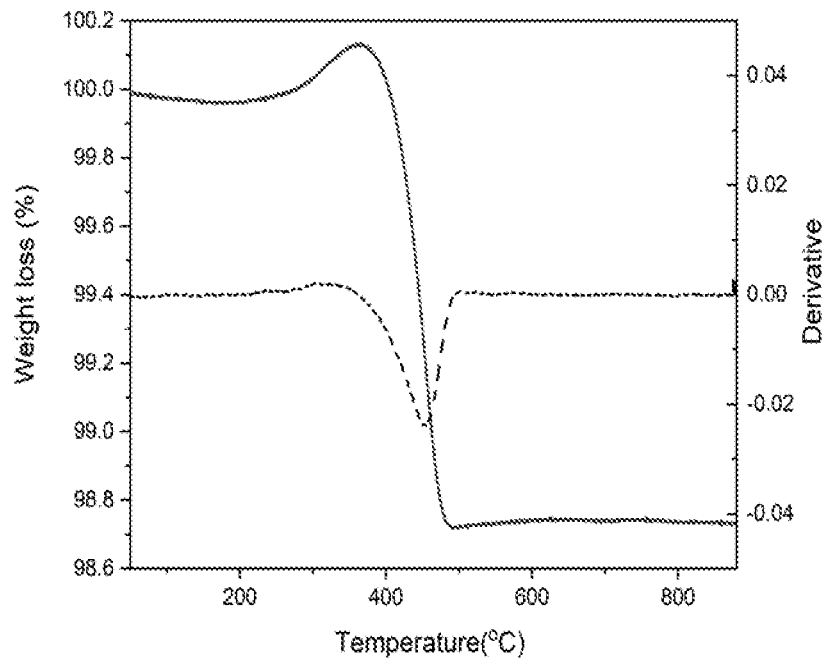
FIG. 8: TGA of Sample 5 in air, showing the absolute weight loss and the differential.
Figure 9:
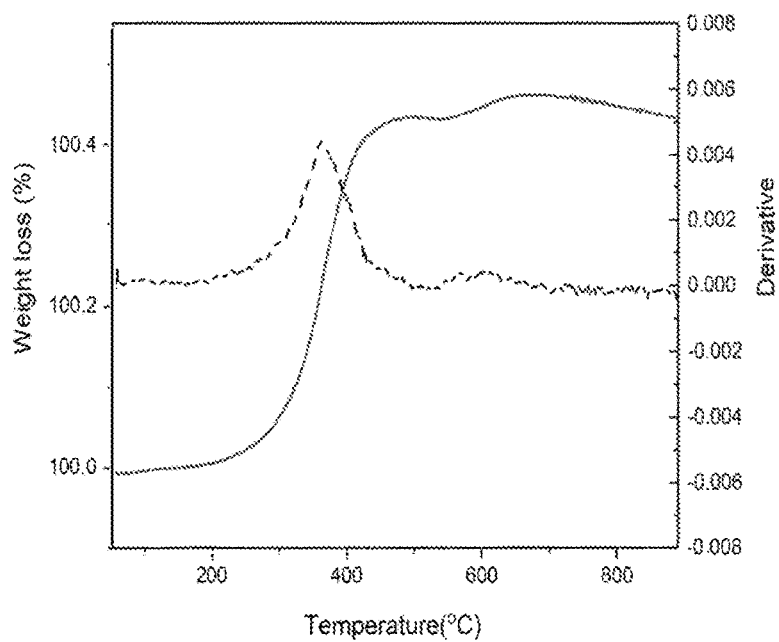
FIG. 9: TGA of Sample 7 in air, showing the absolute weight loss and differential.
Figure 10:
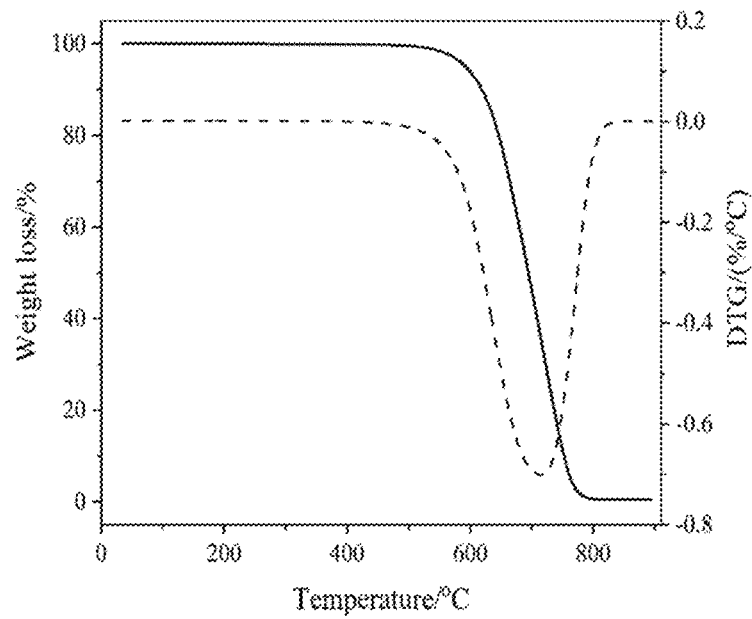
FIG. 10: TGA of petroleum pitch that has been pyrolysed at 900° C. in $N_2$, testing in air showing the absolute weight loss and differential.

FIG. 4 shows the measured XRD diffraction patterns for samples 6 and 7 which are relevant to Example C. Diffraction patterns have peaks at the same locations (within instrument error, that is 0.1°) and match JCPDS crystallography database entry database JCPDS 01-072-1649, which corresponds to $PNb_9O_{25}$. Sample 7 has some changes to its peaks due to the introduced oxygen-deficiency beginning to induce minor crystallographic distortions due to vacancy defects, and additional peaks relating to the carbon coating at ~26° and ~35°. There is no amorphous background noise and the peaks are sharp and intense. This means that all samples are phase-pure and crystalline, with crystallite size ~200 nm according to the Scherrer equation and crystal structure matching $PNb_9O_{25}$. This confirms the presence of a Wadsley-Roth crystal structure.

Figure E1 shows the measured XRD diffraction patterns for Samples E1-E5. Diffraction patterns have peaks at the same locations (within instrument error, that is 0.1°), and match JCPDS crystallography database entry JCPDS 72-159 (isostructural $Ti_2Nb_{10}O_{29}$). There is no amorphous background noise and the peaks are sharp and intense. This means that all samples are phase-pure and crystalline, with crystallite size ~50 nm according to the Scherrer equation and crystal structure matching $AlNb_{11}O_{29}$. This confirms the presence of a Wadsley-Roth crystal structure.

Thermogravimetric Analysis (TGA) was performed on some samples using a Perkin Elmer Pyris 1 system in an air atmosphere. Samples were heated from 30° C. to 900° C. at 5° C./min, with an air flow of 20 mL/min. TGA was performed on samples 2, 4a, 4b, 5, 7 and reference pyrolyzed pitch carbon to quantify mass changes on oxidation. Samples E2-E6 were heated from 50° C. to 900° C. at 3° C./min. Although some samples do not exhibit a mass gain or mass loss, this does not mean there is no oxygen deficiency or carbon coating present. This is a result of overlapping mass gain and loss processes.

TABLE 3

A summary of mass gain and mass loss
as measured by TGA analysis in air.

| Sample | Measured mass gain [%] | Measured mass loss [%] |
|---|---|---|
| 2 | 1.02 | 0.62 |
| 4a | — | 1.03 |
| 4b | 1.27 | — |
| 5** | 0.13 | 1.41 |
| 7 | 0.47 | — |
| E2 | 0.030 | 0.760 |
| E3 | — | 1.094 |
| E4** | 0.028 | 0.681 |
| E5** | — | 0.537 |
| E6 | 0.030 | 0.725 |

**Comparative sample - carbon coating derived from carbohydrate

Particle Size Distributions were obtained with a Horiba laser diffraction particle analyser for dry powder. Air pressure was kept at 0.3 MPa. The results are set out in Table 1. BET surface area analysis was carried out with $N_2$ on a BELSORP-miniX instrument at 77.35 K and are set out in Table 2.

Figure 11:
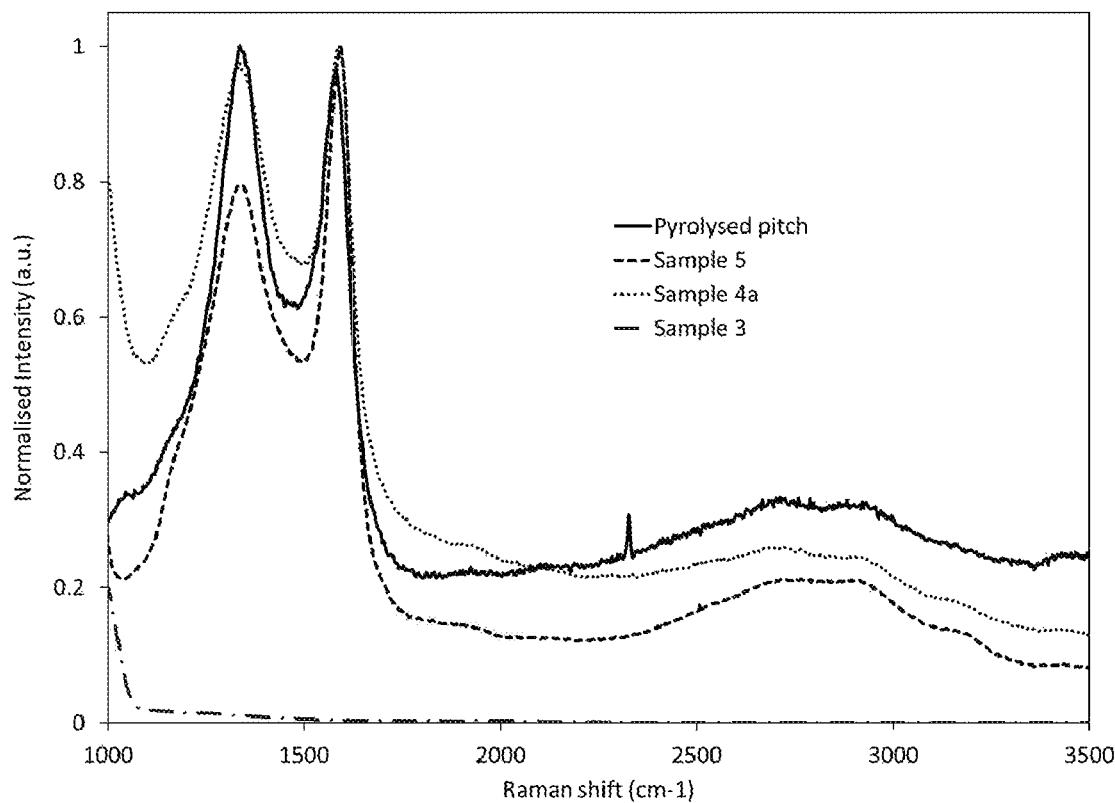
FIG. 11: An overlay of Raman spectra for several samples. Intensity has been normalised to the maximum in the region 1000-3500 $cm^{-1}$, apart from sample 3 that showed no signal and was normalised to its maximum across the measurement range 100-4000 $cm^{-1}$

Confocal Raman spectroscopy was carried out on selected samples to characterise the carbon coating present (FIG. 11). A laser excitation of 532 nm and attenuation of 1% and 50% of maximum power was used on a Horiba Labram HR Confocal Raman Microscope, with samples placed on an aluminium well plate. Spectra were recorded with 120 s accumulation and 2 scans, with 6 repeats from different locations of the sample to provide averaged spectra in the range 100-4000 cm⁻¹.

Confocal Raman spectroscopy was carried out on samples E1-E5 (Figure E5). A laser excitation of 532 nm, attenuation of 10% and magnification of 50 was used on a Horiba Xplora Plus Raman microscope, with samples placed on an adhesive tape. Spectra were recorded with on average an acquisition time of 15 s per scan, 3 repeats and 3 different sample locations in the spectral range of 250-2500 cm⁻¹.

Electrochemical Characterisation

Li-ion cell charge rate is usually expressed as a "C-rate". A 1 C charge rate means a charge current such that the cell is fully charged in 1 h, 10 C charge means that the battery is fully charged in 1/10th of an hour (6 minutes). C-rate hereon is defined from the reversible capacity of the anode within the voltage limits applied, i.e. for an anode that exhibits 1.0 mAh cm⁻² capacity within the voltage limits of 1.1-3.0 V, a 1 C rate corresponds to a current density applied of 1.0 mA cm⁻².

Electrochemical tests were carried out in half-coin cells (CR2032 size) for analysis. In half-coin tests, the active material is tested in an electrode versus a Li metal electrode to assess its fundamental performance. In the below examples, the active material composition to be tested was combined with N-Methyl Pyrrolidone (NMP), carbon black acting as a conductive additive, and poly(vinyldifluoride) (PVDF) binder and mixed to form a slurry using a lab-scale centrifugal planetary mixer. The non-NMP composition of the slurries was 90 wt % active material, 6 wt % conductive additive, 4 wt % binder. The slurry was coated on an Al foil current collector to the desired loading of 40 g m$^{-2}$ by doctor blade coating and dried. The electrodes were then calendared to a density of 2.4-3.0 g cm$^{-3}$ at 80° C. to achieve targeted porosities of 35-40%. Electrodes were punched out at the desired size and combined with a separator (Celgard porous PP/PE), Li metal, and electrolyte (1.3 M LiPF$_6$ in EC/DEC) inside a steel coin cell casing and sealed under pressure. Cycling was then carried out at low current rates (C/10) for 2 full cycles of lithiation and de-lithiation between 1.1-3.0 V for samples 1-5, E1-E6, and 1.0-3.0 V for samples 6-7. Afterwards, the cells were tested for their performance at increasing current densities. During rate tests, the cells were cycled asymmetric, with a slow charge (C/5) followed by increasing discharge rates for dischargeability tests, and vice versa for chargeability tests. For Samples E1-E6, the measurement was carried out in triplicate, with errors shown calculated from their standard deviation.

Nominal voltage vs Li/Li+ has been calculated from the integral of the V/Q curve divided by the total capacity on the 2$^{nd}$ cycle C/10 lithiation or de-lithiation.

The area specific impedance (ASI) was calculated from the direct current internal resistance (DCIR) by multiplying the DCIR in Ω by the area of the electrode disc in cm$^2$. The DCIR was measured by de-lithiating the anode to 50% of its State-of-Charge (SoC) at a rate of 0.2 C, and then applying a 5 C pulse for 10 s. The 0.2 C rate is then resumed to full de-lithiation. The DCIR was calculated from the maximum voltage difference ($\Delta V_{max}$) observed and the applied current ($I_{app}$) as follows: $R=I_{app}/\Delta V_{max}$. For Samples E1-E6, the measurement was carried out in triplicate, with errors shown calculated from their standard deviation.

The electrical resistivity of the electrode coating was assessed by a 4-point-probe method with an Ossila instrument. An electrode coating was prepared to a mass loading of 70 g cm$^{-2}$ and calendared to a density of 2 g cm$^{-3}$ on a sheet of insulating mylar for all samples. The sheet resistance was then measured on a 15 mm diameter disc in units of Ω per square. The measurement was carried out in triplicate, with errors shown calculated from their standard deviation.

Homogeneous, smooth coatings on both Cu and Al current collector foils, the coatings being free of visible defects or aggregates were also prepared as above for sample 1 and 2 with a centrifugal planetary mixer to a composition of up to 94 wt % active material, 4 wt % conductive additive, 2 wt % binder. These have been prepared with both NMP/PVDF and aqueous/CMC:SBR-based binder systems. The coatings were calendared at 80° C. for PVDF and 50° C. for CMC:SBR to a density of 2.4-3.0 g cm$^{-3}$ (electrode porosity of 35-40%) at loadings from 1.0 to 3.5 mAh cm$^{-2}$. Feasibly, loadings up to 5.0 mAh cm$^{-2}$ may be of interest for more energy-focused applications. This is an important demonstration of these materials being viable in a commercially focused electrodes for both high energy and high-power applications.

TABLE 4

A summary of impedance measurements carried out as described. Resistivity was measured by 4-point-probe techniques, and area specific impedance was measured on the half-coin cells with a DCIR pulse as described.

| Sample | Sheet resistance [Ω per square] | Area Specific Impedance [Ω · cm$^2$] |
|---|---|---|
| 1* | 740 ± 36 | 62 |
| 2 | 625 ± 31 | 48 |
| 3* | 756 ± 30 | 65 |
| 4a | 623 ± 36 | 39 |
| 4b | 430 ± 21 | 39 |
| 5** | 1286 ± 148 | 69 |
| 6* | 594 ± 37 | 46 |
| 7 | 517 ± 32 | 43 |
| E1* | 779 ± 47 | 35 ± 1 |
| E2 | 743 ± 50 | 37 ± 2 |
| E3 | 601 ± 55 | 35 ± 1 |
| E4** | 780 ± 14 | 57 ± 1 |
| E5** | 783 ± 12 | 55 ± 2 |
| E6 | 768 ± 19 | 44 ± 3 |

*Comparative sample - no carbon coating
**Comparative sample - carbon coating derived from carbohydrate

TABLE 5

A summary of electrochemical testing results from Li-ion half coin cells. In general (although not exclusively) it is beneficial to have a higher capacity, a higher ICE, and a lower nominal voltage.

| Sample | Delithiation specific capacity C/10 [mAh/g] | Initial coulombic efficiency [%] | Nominal lithiation voltage vs Li/Li$^+$ [V] | Nominal de-lithiation voltage vs Li/Li$^+$ [V] |
|---|---|---|---|---|
| 1* | 202 | 89.4 | 1.60 | 1.68 |
| 2 | 211 | 94.2 | 1.56 | 1.63 |
| 3* | 159 | 96.4 | 1.77 | 1.84 |
| 4a | 165 | 96.6 | 1.73 | 1.81 |
| 4b | 156 | 95.8 | 1.69 | 1.77 |
| 5** | 209 | 87.8 | 1.60 | 1.68 |
| 6* | 202 | 96.6 | 1.51 | 1.59 |
| 7 | 219 | 97.6 | 1.50 | 1.57 |
| E1* | 208 ± 4 | 97.8 ± 0.4 | 1.548 | 1.590 |
| E2 | 203 ± 6 | 97.9 ± 0.1 | 1.549 | 1.596 |
| E3 | 214 ± 6 | 98.0 ± 0.2 | 1.548 | 1.597 |
| E4** | 188 ± 6 | 96.8 ± 0.3 | 1.538 | 1.614 |
| E5** | 150 ± 12 | 96.4 ± 0.3 | 1.536 | 1.615 |
| E6 | 205 ± 3 | 89.7 ± 0.1 | 1.589 | 1.650 |

*Comparative sample - no carbon coating
**Comparative sample - carbon coating derived from carbohydrate

TABLE 6

A summary of electrochemical testing results from Li-ion half coin cells. In general (although not exclusively) it is beneficial to have a higher capacity retention for lithiation and de-lithiation. As these are measured in half-coin cells, the lithiation ability is severely limited at high C-rates due to limitations on Li ion extraction from the Li metal counter electrode. This is not the case in full cells with a cathode material instead of Li metal (e.g. NMC, LNMO, LFP, LCO, LMO etc.), which are more accurately represented by the de-lithiation capacity retention values.

| Sample | 5 C/0.5 C lithiation capacity retention [%] | 10 C/0.5 C lithiation capacity retention [%] | 5 C/0.5 C de-lithiation capacity retention [%] | 10 C/0.5 C de-lithiation capacity retention [%] |
|---|---|---|---|---|
| 1* | 65.7 | 37.8 | 94.4 | 91.4 |
| 2 | 71.2 | 60.0 | 99.0 | 97.6 |
| 3* | 85.2 | 76.8 | 96.2 | 93.4 |
| 4a | 84.0 | 75.1 | 96.9 | 94.3 |
| 4b | 83.4 | 76.3 | 95.6 | 93.1 |

TABLE 6-continued

A summary of electrochemical testing results from Li-ion half coin cells. In general (although not exclusively) it is beneficial to have a higher capacity retention for lithiation and de-lithiation. As these are measured in half-coin cells, the lithiation ability is severely limited at high C-rates due to limitations on Li ion extraction from the Li metal counter electrode. This is not the case in full cells with a cathode material instead of Li metal (e.g. NMC, LNMO, LFP, LCO, LMO etc.), which are more accurately represented by the de-lithiation capacity retention values.

| Sample | 5 C/0.5 C lithiation capacity retention [%] | 10 C/0.5 C lithiation capacity retention [%] | 5 C/0.5 C de-lithiation capacity retention [%] | 10 C/0.5 C de-lithiation capacity retention [%] |
| --- | --- | --- | --- | --- |
| 5** | 68.9 | 55.7 | 97.5 | 95.6 |
| 6* | 37.7 | 9.6 | 64.6 | 51.1 |
| 7 | 75.1 | 51.3 | 83.1 | 74.6 |
| E1* | — | — | 95.5 ± 0.3 | 93.7 ± 0.5 |
| E2 | — | — | 98.4 ± 0.9 | 98.1 ± 1.4 |
| E3 | — | — | 99.4 ± 0.0 | 99.7 ± 0.1 |
| E4** | — | — | 99.9 ± 0.2 | 100.2 ± 0.2 |
| E5** | — | — | 98.5 ± 0.5 | 98.2 ± 0.9 |
| E6 | — | — | 95.3 ± 0.4 | 93.7 ± 0.6 |

*Comparative sample - no carbon coating
**Comparative sample - carbon coating derived from carbohydrate Example A Comparative sample 1 has a Wadsley-Roth 3×4 block shear crystal structure where all blocks are connected by tetrahedra, that has been made partially oxygen-deficient. In sample 2, this has been coated with pitch by high energy milling, and then pyrolysed to provide enhanced oxygen deficiency, and a polyaromatic sp²-based carbon coating based on a pitch precursor. The pyrolysis process promotes the formation of oxygen deficiencies in the coated crystal; theorised to be due to the catalytic effect of the carbon-based material promoting metal oxide reduction, and the production of reducing gases such as H₂ in the carbon pyrolysis process in close proximity to the crystal surface.

Characterisation by XRD highlight this, where peak shifts are observed between sample 1 and 2 due to the introduced oxygen vacancies, along with new peaks prescribed to the formation of semi-crystalline polyaromatic domains of sp² carbon at ~26° and ~40°. TGA analysis further evidences a significant degree of measurable oxygen deficiency at 1.02 wt %, and a mass loss of 0.62 wt % corresponding to carbon content. The introduction of a conductive carbon coating on the surface of the crystals, and oxygen deficiencies in the crystal structure result in reduced electrical resistivity as measured by 4-point-probe analysis of equivalent composite coatings. From electrochemical tests in half cells, clear advantages are observed for sample 2 over sample 1 in FIG. 11, with a much reduced nominal voltage vs Li/Li⁺, and largely reduced slope of the voltage curve at low and high degrees of lithiation implying the coating has reduced impedance significantly. This is further evidenced by the ASI reducing from 62 to 48 Ω·cm², showing a large reduction in the impedance of the cell as a result of the coated and deficient material.

In Table 4 and Table 5, half-cell test data demonstrates various improvements for sample 2 over comparative sample 1. With similar BET surface area, the ICE shows a significant improvement of 4.8% from sample 1 to sample 2, evidencing that the presence of the surface coating and oxygen deficiencies are reducing losses of Li ions through reducing the number of Li ions being trapped in the crystal structure upon lithiation due to introduced oxygen vacancies, and/or through reducing side reactions with the electrolyte. Advantageous reduction in nominal voltage is shown for sample 2 over sample 1 in both lithiation and delithiation, evidencing the reduced impedance in the Li-ion cells upon polyaromatic sp² carbon coating, and differing degrees of oxygen deficiency that directly affect internal conductivity (oxygen deficiency) and surface/interface conductivity (carbon coating). Similarly the lithiation and de-lithiation rate capability is significantly improved for samples 2 over sample 3, which is a culmination of the various improvements described above.

Sample E6 has been prepared from Sample 1 in a similar fashion as for the pitch-carbon based samples with multi-layered graphene oxide (GO) as an alternative source of polyaromatic sp² carbon. Sample E6 exhibits a higher ICE, a lower nominal voltage, and higher capacity retention at high de-lithiation rates at 5 C and 10 C compared to Sample 1.

It is expected that similar benefits will be observed with all Wadsley-Roth crystal structures that contain Nb for use in Li-ion cells.

Example B

Comparative sample 3 has a Bronze crystal structure. Specifically, the W₇Nb₄O₃₁ base crystal structure has 3, 4, and 5 sided tunnels with a low degree of filled tunnels, resulting in a high availability of Li-ion intercalation sites.

To provide samples 4a and 4b, sample 3 was coated with pitch by high energy milling and pyrolysed under different conditions. Sample 4a was pyrolysed at 700° C., and sample 4b was pyrolysed at 800° C. to demonstrate the differing advantages that can be gained by controlling the pyrolysis process. At lower temperature for a short period of time in sample 4a, the pitch-carbon has pyrolysed but been kinetically arrested such that it has not had sufficient time to form large polyaromatic domains of sp² carbon that would have a higher decomposition temperature in TGA as for the reference sample of pyrolysed pitch. Additionally, there is no measured mass gain for this sample due to the limited time and lower temperature, and the XRD is unchanged to reflect this within its available signal to noise. Sample 4b shows oxygen deficiency by TGA, with carbon decomposition overlapped with the mass gain observed, and demonstrates peak shifts in XRD associated with the oxygen vacancies that have been introduced.

Figure 12:
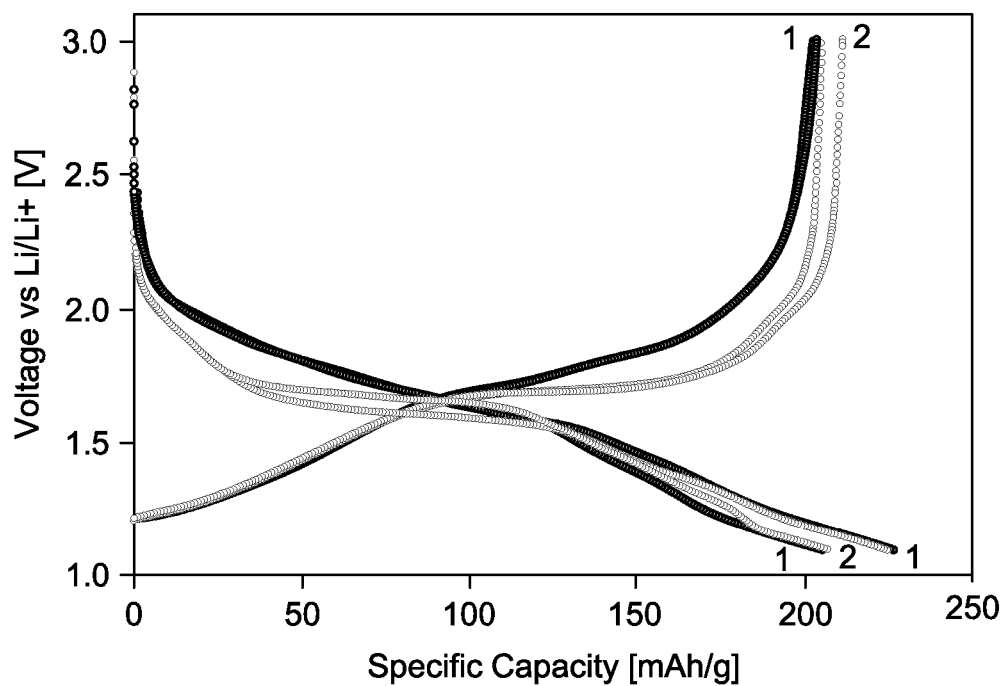
FIG. 12: Galvanostatic charge/discharge curves for Sample 1 and 2 at a rate of C/10 for their first lithiation and de-lithiation cycles, between 1.1-3.0 V.
Figure 13:
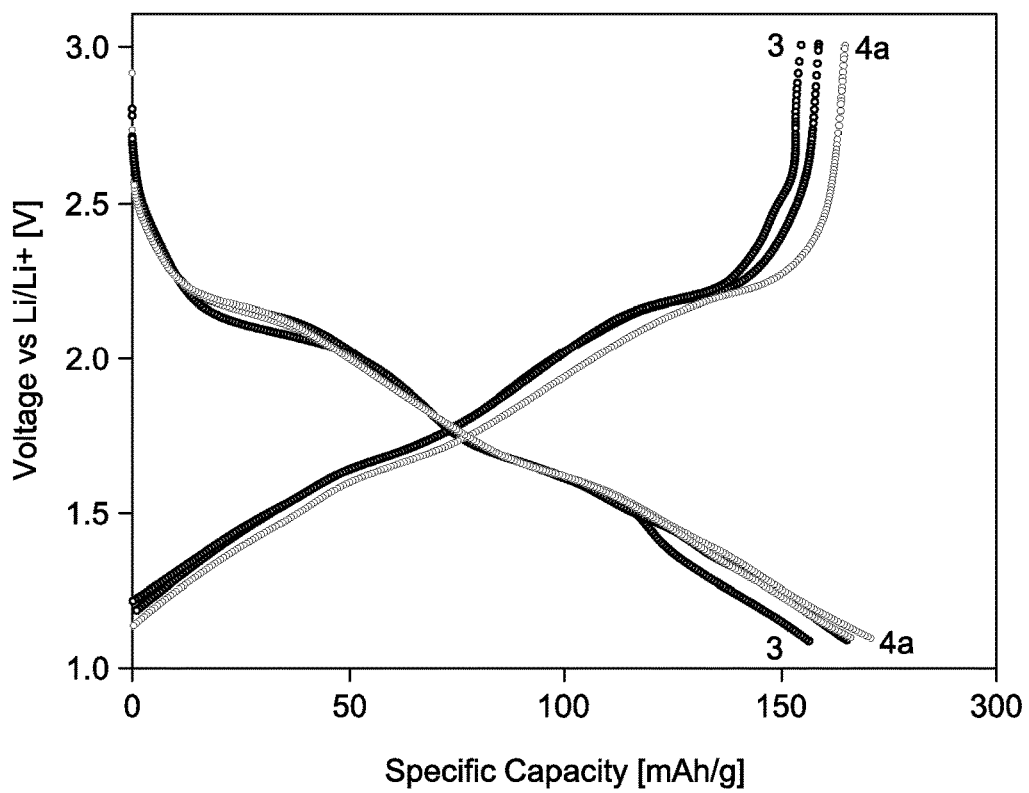
FIG. 13: Galvanostatic charge/discharge curves for Sample 3 and 4a at a rate of C/10 for their first lithiation and de-lithiation cycles, between 1.1-3.0 V.
Figure 14:
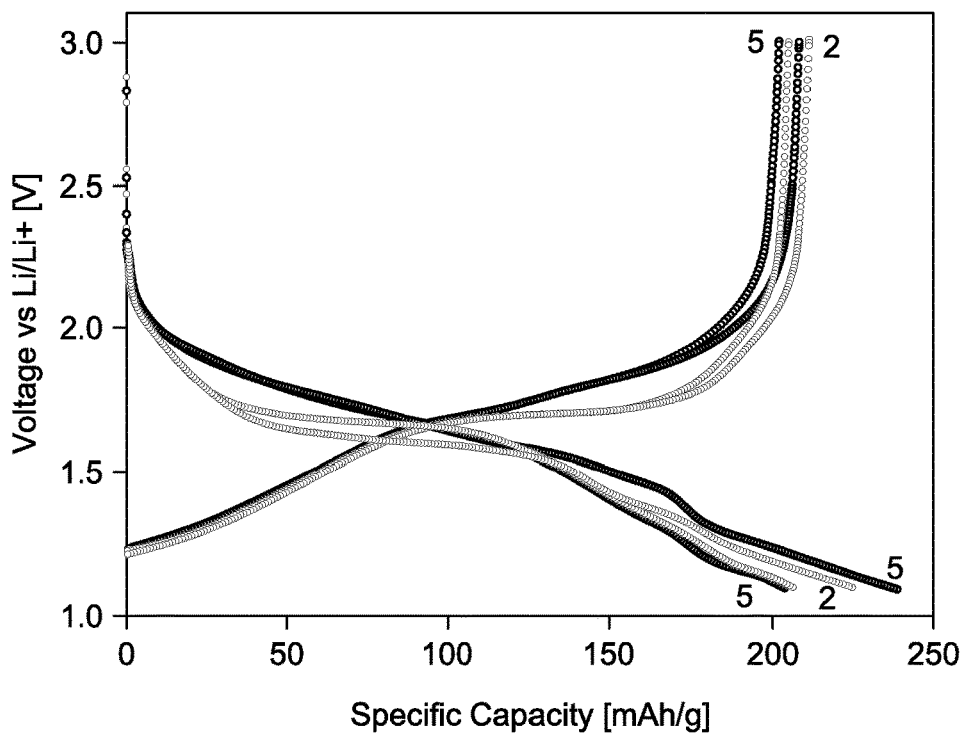
FIG. 14: Galvanostatic charge/discharge curves for Sample 5 and 2 at a rate of C/10 for their first lithiation and de-lithiation cycles, between 1.1-3.0 V.
Figure 15:
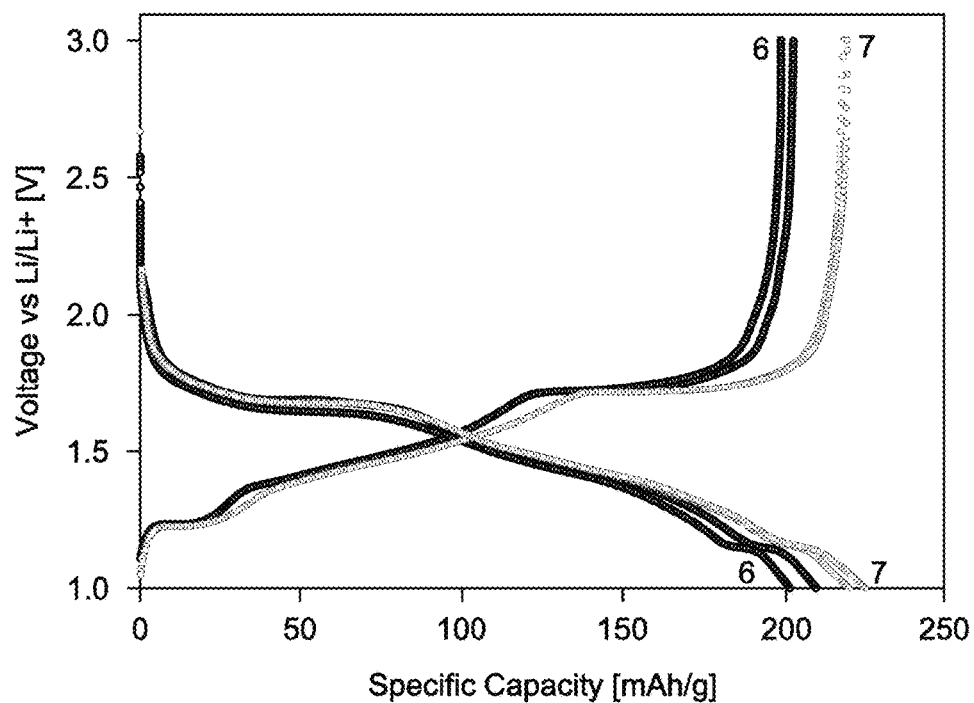
FIG. 15: Galvanostatic charge/discharge curves for Sample 6 and 7 at a rate of C/10 for their first lithiation and de-lithiation cycles, between 1.0-3.0 V.
Figure 16:
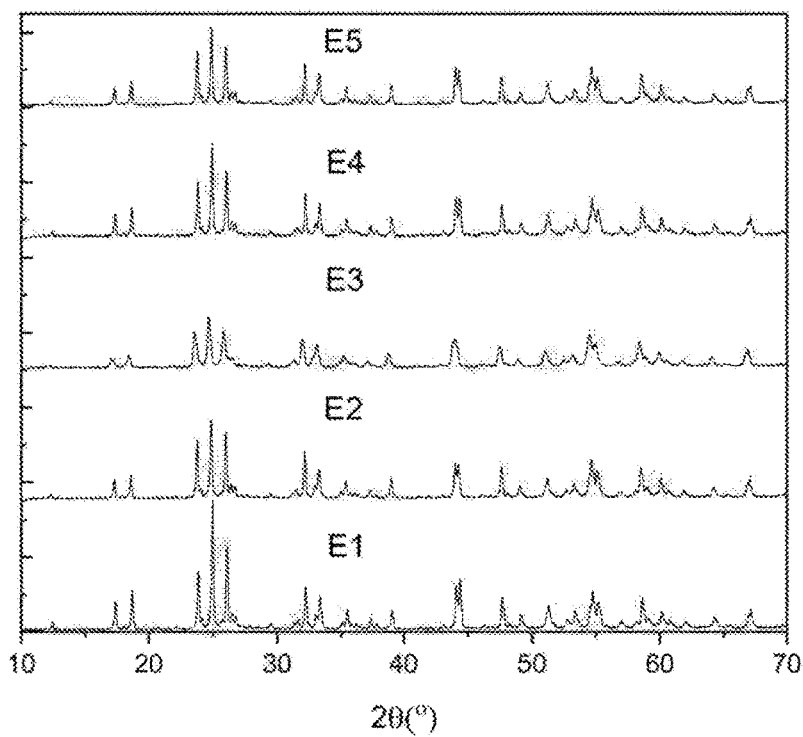
FIG. 16: Powder XRD of Samples E1-E5. In Samples E2, E3 peak changes are observed due to the induced oxygen deficiencies.
Figure 17:
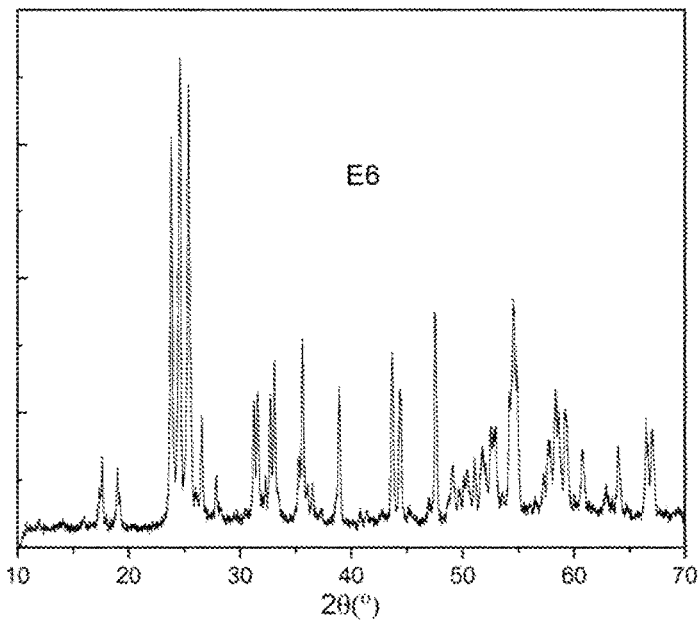
FIG. 17: Powder XRD of Sample E6, matching reference Sample 1.
Figure 18:
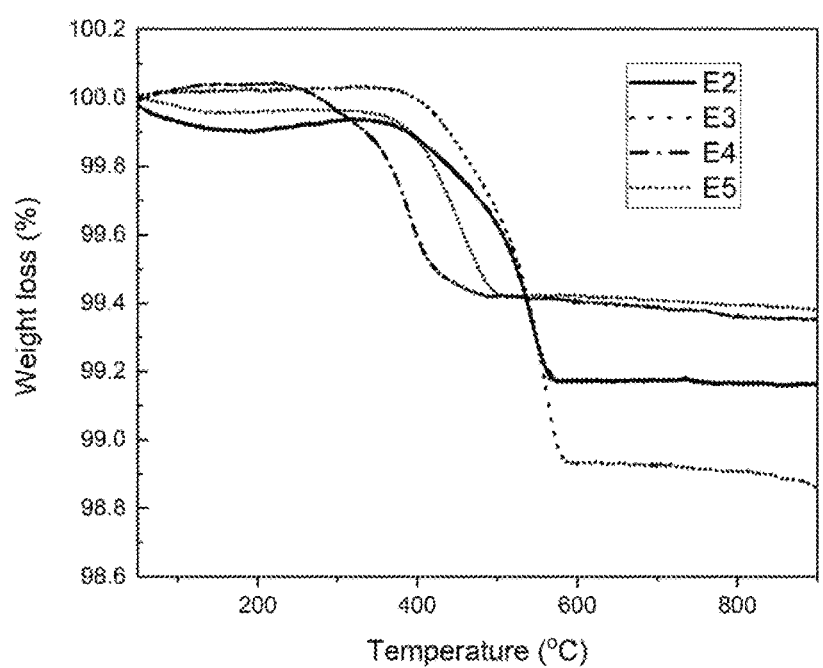
FIG. 18: TGA of Samples E2-E5 overlayed, showing the absolute weight change.
Figure 19:
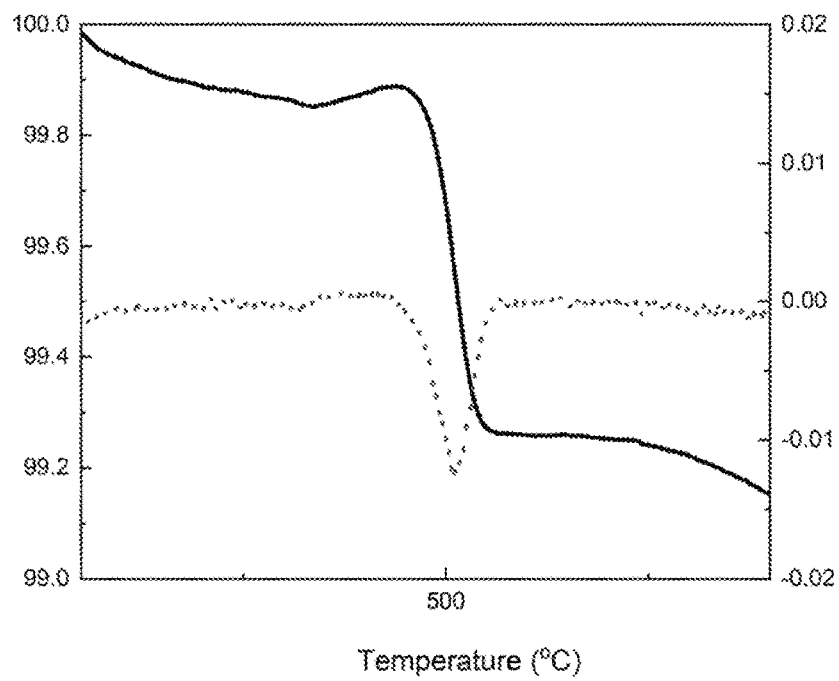
FIG. 19: TGA of Sample E6, showing the absolute weight change.
Figure 20:
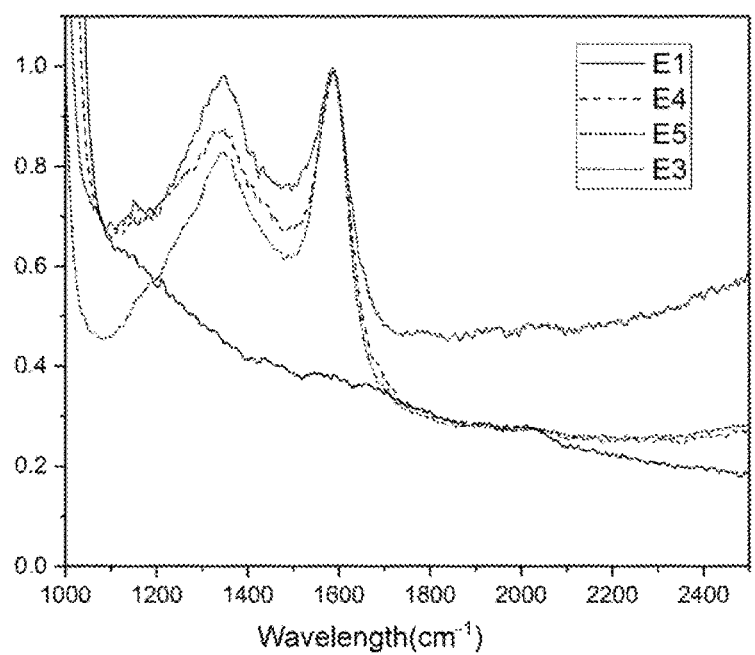
FIG. 20: An overlay Raman spectra for Samples E1, E3, E4, E5. Intensity has been normalised to the maximum in the region 1200-2000 $cm^{-1}$, except for reference sample E1.
Figure 21:
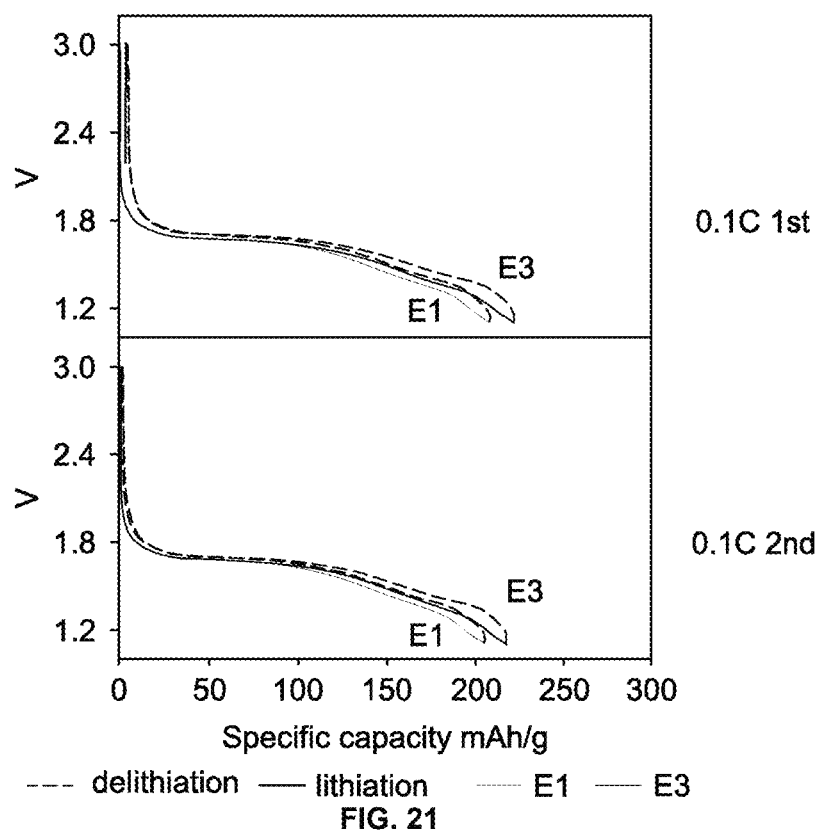
FIG. 21: Galvanostatic charge/discharge curves for Sample E1 and E3 at a rate of C/10 for their first lithiation and de-lithiation cycles, between 1.1-3.0 V.
Figure 22:
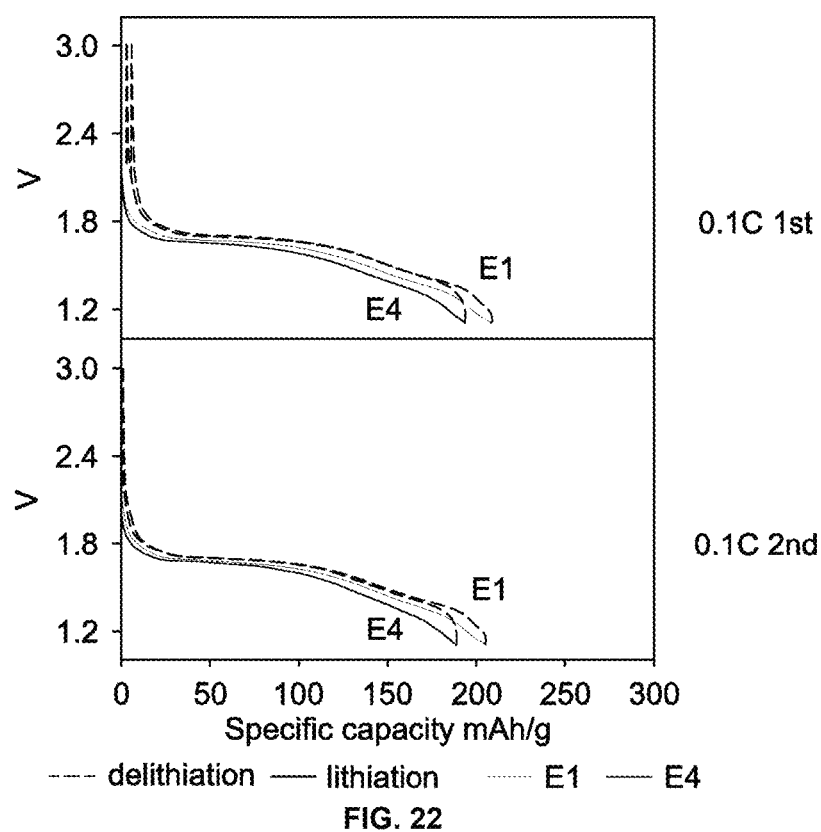
FIG. 22: Galvanostatic charge/discharge curves for Sample E1 and E4 at a rate of C/10 for their first lithiation and de-lithiation cycles, between 1.1-3.0 V.
Figure 23:
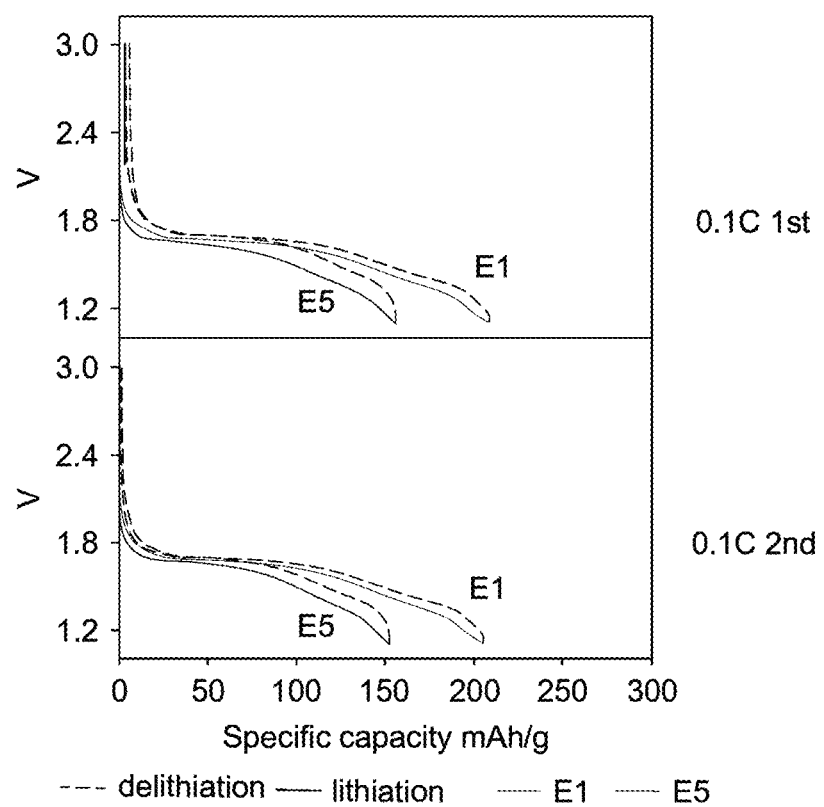
FIG. 23: Galvanostatic charge/discharge curves for Sample E1 and E5 at a rate of C/10 for their first lithiation and de-lithiation cycles, between 1.1-3.0 V.

Assessment of electrical resistivity in Table 3 demonstrates a trend of reducing values as follows: 3>4a>4b. This reflects the increasing degree of oxygen deficiency and size and partial crystallinity of polyaromatic sp² domains, as evidenced by TGA. From electrochemical tests, there is an improvement in the voltage profile between sample 3 and samples 4a and 4b as shown in FIG. 12, with increased capacity and lower nominal voltage. In terms of ASI, a combination of electrical and ionic resistances in a Li-ion system, there is an equal improvement between sample 3 and samples 4a and 4b from 65 to 39 Ω·cm².

In Table 4 and Table 5, half-cell test data demonstrates various improvements for samples 4a and 4b over comparative sample 3. Even with an increase in surface area of the material from sample 3 and 4a by a factor of 5, the ICE shows a slight improvement within sample 4a over sample 3, which is unexpected. Typically an increase in surface area results in a decreased ICE due to more available surface area for parasitic side reactions, whereas in this case the coating has been shown to improve the ICE evidencing the coating has either reduced the effect of any side reactions (such as electrolyte reactions) and/or decreased irreversible trapping of Li ions in the material crystal structure. Advantageous reduction in nominal voltage is shown for sample 4a and 4b, with the highest reduction for sample 4b. This evidences the reduced impedance in the Li-ion cells upon polyaromatic $sp^2$ carbon coating, and differing degrees of oxygen deficiency that directly affect internal conductivity (oxygen deficiency) and surface/interface conductivity (carbon coating). Similarly the de-lithiation rate capability is improved for samples 4a and 4b over sample 3.

It is expected that similar benefits will be observed with all Bronze crystal structures that contain Nb for use in Li-ion cells.

Example C

Sample 5 was prepared as a comparative example of a carbon-coated mixed niobium oxide material that had a different carbon type as compared to samples 2, 4a, 4b, and 7. This sample was prepared with a carbohydrate that was then pyrolysed, which is theorised to result in a crystalline form of carbon that is a mixture of $sp^2$ and $sp^3$ bonding mechanisms, and is free from polyaromatic $sp^2$ carbon. This sample was characterised by XRD, TGA, electrical resistivity, and electrochemical characterisations. XRD matches between sample 5 and sample 1 showing the active material is unchanged after the carbon coating process. TGA analysis shows the differing form of carbon, with a decomposition starting at 350° C. in an air atmosphere. By electrical resistivity measurements, an increase in resistance is observed as compared to sample 1, even with a higher amount of carbon being present in the sample. This demonstrates that having polyaromatic domains of $sp^2$ carbon that conformally coats as for samples 2, 4a, 4b, and 7 is more beneficial with regards to the materials' electrical resistivity, a key factor in Li-ion cell performance.

Raman spectroscopy was additionally carried out to demonstrate differences in the type of carbon present as in FIG. 11. It is characteristic of carbon to have a response in Raman spectra relating to different vibrational (and minor rotational) processes taking place, most observed in the region 1000-3500 $cm^{-1}$. The characteristic D, G, and 2D peaks are utilised when considering different forms of carbon bonding ($sp^2$, $sp^3$, mixtures), and degree of crystallinity. Comparative sample 3 shows no response in this region with no carbon coating. Reference sample of pyrolysed pitch that provides $sp^2$ polyaromatic domains of amorphous and semi-crystalline carbons shows clear D and G peaks of intensity ratio $I_D/I_G=1.02$, and evidence of a 2D peak in the region 2500-3000 $cm^{-1}$. Sample 4a shows a similar spectrum with presence of D, G, 2D peaks evidencing the same type of polyaromatic $sp^2$ carbon is present, with a ratio of $I_D/I_G=0.97$. Comparative sample 5, which is expected to contain a mixture of $sp^2$ and $sp^3$ carbon due to a carbohydrate precursor, shows a different spectrum with ratio $I_D/I_G=0.80$.

In electrochemical tests sample 5 displays lower first cycle efficiency than sample 1 of 87.8%, whereas an increase was observed for sample 2 versus sample 1. This shows the carbohydrate-based carbon precursor is less beneficial for Li-ion cell efficiency compared to a carbon precursor comprising polyaromatic $sp^2$ carbon. The rate performance of sample 5 is greater than that of sample 1, but remains below that of sample 2 due to the differing form of carbon present. Importantly, there is no difference between sample 1 and sample 5 on the nominal lithiation and de-lithiation voltage, whereas there is a large decrease in nominal voltage for sample 2. Sample E6 provided an active electrode material with improved ICE, nominal lithiation and de-lithiation voltage, and significantly improved ASI, compared to sample 5. Accordingly, the use of a carbon precursor comprising polyaromatic $sp^2$ carbon (pitch for sample 2 and GO for sample E6), which forms a carbon coating comprising polyaromatic $sp^2$ carbon, is particularly beneficial for mixed niobium oxides, compared to other types of carbon precursor.

Example D

The active material $PNb_9O_{25}$ (sample 6, off-white in colour) and a carbon-coated variant (sample 7, black in colour) were prepared and characterised by XRD, TGA, PSD, and electrical resistivity by 4-point-probe analysis. The XRD matches between carbon-coated and base material with minor shifts as a result of introduced oxygen vacancies, and additional peaks corresponding to carbon at ~26° and ~35°, demonstrating the crystal structure is maintained after the carbon-coating process and induced oxygen deficiencies. From TGA, the oxygen deficiencies are observed in sample 7 with an associated 0.45 wt % mass gain, and the amount of carbon is masked by the mass gain from the oxidation of the deficient material. The resistivity is decreased upon carbon-coating and inducing oxygen deficiency in the material, demonstrating reduced electrical resistivity of the material upon modification, as shown in examples A and B for other base mixed niobium oxides. Similar advantages can be observed electrochemically as for the aforementioned examples, for example improved capacity retention at high rates, higher capacity, and higher first cycle efficiency.

Example E

Comparative sample E1 has a Wadsley-Roth phase based on $AlNb_{11}O_{29}$, modified by substitution of the $Al^{3+}$ cation with the $Fe^{3+}$ cation. The structure has a monoclinic shear structure with 3×4 octahedra blocks connected by edge-sharing, and have no tetrahedra as for Example A. This material has been processed with petroleum pitch that has a softening point of 118° C. and 250° C. in samples E2 and E3 respectively. Sample E1 has also been processed with carbohydrate comparative materials in samples E4 and E5 by processing with carboxymethylcellulose (CMC) and sucrose respectively.

Samples E2 and E3 share similar mass loss temperatures attributed to their carbon coating oxidising in Figure E3, with a higher amount of carbon present for the pitch carbon with a higher softening point of 250° C. This is due to the precursor pitch carbon having larger domains of polyaromatic $sp^2$ carbons present and less defects, resulting in more efficient conversion to a polyaromatic carbon coating and less mass loss through generation of waste byproducts. The XRD spectra in Figure E1 show a loss in peak sharpness from Sample E1 to E3, and a slight shift in the peak position. This is attributed to an increased degree of oxygen deficiency at the surface of the mixed niobium oxide material in contact with the carbon material resulting in unit cell distortions that can improve electrical conductivity. These material characteristics are reflected in their electrical, and electrochemical, characteristics. Sample E2, E3 show a decreased sheet resistance, a greatly decreased ASI, similar specific capacities, similar ICE, and increased capacity retention at high C-rates versus Sample E1.

Sample E4 and E5 have a lower mass loss temperature attributed to the carbon coating in Figure E3, and a lower absolute amount of carbon present as compared to samples E2 and E3. The XRD spectra for Sample E4 and E5 show minimal change as compared to Sample E1. However, the carbon coating from these two carbohydrate materials, CMC and sucrose, is different in its characteristics to that originating from polyaromatic sp$^2$ precursors such as pitch carbons or graphene oxide. From electrical and electrochemical characterisations, sample E4, E5 show similar sheet resistance to Sample E1, increased or similar ASI, greatly reduced specific capacity and lower ICE. Whilst Sample E4, E5 do demonstrate improved capacity retention versus sample E1, the specific capacity that is available to be charged and discharged is greatly reduced, and the resistivity and ASI are much higher. The specific capacity, resistivity, and ASI of Samples E4 and E5 is also inferior to that of Samples E2 and E3. This is further evidenced by the large difference between the lithiation and de-lithiation nominal voltage for comparative samples E4, E5 versus samples E1-E3. The reduced specific capacity for the comparative samples evidence a loss of available Li-ion sites in the core active material, theorised to be due to a reaction between the carbohydrate and surface of the material causing a loss of the crystal structure. The electrochemical data thus demonstrate that the samples formed from two different pitch carbons as the carbon precursor comprising polyaromatic sp$^2$ carbon (E2 and E3) have improved properties for use in lithium-ion battery anodes compared to the samples formed from other types of carbon precursor, CMC and sucrose (E4 and E5).

Figure E5 shows comparative Raman spectroscopy for samples E1, E3, E4 and E5 in the range 1000-2500 cm$^{-1}$. Reference Sample E1 shows no evidence of D or G peaks. Sample E3 displays a similar characteristic to that of Sample 4a and reference sample of pyrolysed petroleum pitch carbon, with similar intensity of the D and G peaks. The carbohydrate-based samples E4, E5 both display a $I_D/I_G$ ratio in the range 0.80-0.88, similar to that of Sample 5. This further evidences the different form of carbon present when the precursor is a polyaromatic sp$^2$ carbon versus a carbohydrate such as CMC or sucrose.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

REFERENCES

A number of publications are cited above in order to more fully describe and disclose the invention and the state of the art to which the invention pertains. Full citations for these references are provided below. The entirety of each of these references is incorporated herein.

[1] J. B. Goodenough et. al., *J. Am. Chem. Soc.*, 135, (2013), 1167-1176.
[2] R. J. Cava, *J. Electrochem. Soc.*, (1983), 2345.
[3] R. J. Cava, Solid State Ionics 9 & 10 (1983)407-412
[4] Kent J. Griffith et. al., *J. Am. Chem. Soc.*, 138, (2016), 8888-8889.
[5] Yoon Ji Jo et. al., *Korean J. Chem. Eng.*, 36(10), (2019), 1724-1731.
[6] Kent J. Griffith et. al., *Inorganic Chemistry*, 56, (2017), 4002-4010.
[7] Sagrario M. Montemayor et. al., *J. Mater. Chem.*, 8 (1998), 2777-2781.
[8] Botella et. Al., *Catalysis Today*, 158 (2010), 162-169.

The invention claimed is:

1. A method of making an active electrode material, the method comprising:
providing a mixed niobium oxide having a Wadsley-Roth or Tetragonal Tungsten Bronze crystal structure, wherein the mixed niobium oxide is expressed by the formula MNb$_b$O$_c$, wherein M represents one or more cations, b satisfies 0.13≤b≤49, and c satisfies 3.3≤c≤124;
combining the mixed niobium oxide with a carbon precursor to form an intermediate material, wherein the carbon precursor comprises polyaromatic sp$^2$ carbon and is selected from pitch carbons wherein the intermediate material comprises the carbon precursor in an amount of 0.1-25 wt %; and
heating the intermediate material under reducing conditions to pyrolyse the carbon precursor forming a carbon coating on the mixed niobium oxide and introducing oxygen vacancies into the mixed niobium oxide, thereby forming the active electrode material;
wherein the step of heating the intermediate material under reducing conditions is performed at a temperature in the range of 400-1,200° C. under an inert gas; or under a mixture of an inert gas and hydrogen; or under vacuum; and
wherein the active electrode material has an Ip/IG ratio as observed by Raman spectroscopy within the range of 0.90-1.15.

2. The method of claim 1, wherein the pitch carbons are selected from coal tar pitch, petroleum pitch, mesophase pitch, wood tar pitch, isotropic pitch, bitumen, and mixtures thereof.

3. The method of claim 1, wherein the intermediate material comprises the carbon precursor in an amount of 0.1-15 wt %, or 0.2-8 wt %, based on the total weight of the mixed niobium oxide and the carbon precursor.

4. The method of claim 1, wherein the carbon coating on the active electrode material is present in an amount of up to 10 wt %, or 0.05-5 wt %, or 0.1-3 wt %, based on the total weight of the active electrode material.

5. The method of claim 1, wherein the step of combining the mixed niobium oxide with the carbon precursor comprises high energy milling.

6. The method of claim 1, wherein the step of combining the mixed niobium oxide with the carbon precursor comprises mixing the mixed niobium oxide with the carbon precursor in a solvent.

7. The method of claim 1, wherein the step of heating the intermediate material under reducing conditions is performed at a temperature in the range of 500-1,100° C. or 600-900° C.

8. The method of claim 1, wherein the step of heating the intermediate material under reducing conditions is performed for a duration within the range of 30 minutes to 12 hours, or 1-9 hours, or 2-6 hours.

9. The method of claim 1, wherein the step of heating the intermediate material under reducing conditions is performed under an inert gas.

10. The method of claim 1, comprising
providing the mixed niobium oxide;
heating the mixed niobium oxide under reducing conditions to introduce oxygen vacancies into the mixed niobium oxide, thereby forming an oxygen-deficient mixed niobium oxide;
combining the oxygen-deficient mixed niobium oxide with the carbon precursor comprising polyaromatic $sp^2$ carbon to form the intermediate material; and
heating the intermediate material under reducing conditions to pyrolyse the carbon precursor forming a carbon coating on the oxygen-deficient mixed niobium oxide and introducing further oxygen vacancies into the oxygen-deficient mixed niobium oxide, thereby forming the active electrode material.

11. The method of claim 1, wherein the carbon coating is semi-crystalline.

12. The method of claim 11, wherein the carbon coating provides a peak in an XRD pattern of the active electrode material centred at 2θ of about 26° with a width (full width at half maximum) of at least 0.20°, or at least 0.25°, or at least 0.30°.

13. The method of claim 1, wherein the active electrode material has an ID/IG ratio as observed by Raman spectroscopy within the range of 0.90-1.10, or 0.95-1.05.

14. The method of claim 1, wherein the mixed niobium oxide is expressed by the formula $[M1]_x[M2]_{(1-x)}[Nb]_y[O]_z$, wherein:
M1 and M2 are different;
M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd;
M2 represents one or more of Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd; and wherein
x satisfies 0<x<0.5;
y satisfies 0.5≤y≤49; and
z satisfies 4≤z≤124.

15. The method of claim 14, wherein
(i) M2 represents one or more of Mo, W, V, Zr, Al, Ga, Ge, Zn, Ta, Cr, Cu, K, Mg, Ni, Hf; or
(ii) M2 represents one or more of Mo, W, V, Zr, Al, Ga, Ge, Zn, Ta, Cu, K, Mg; or
(iii) M2 represents one or more of Mo, W, V, or Zr.

16. The method of claim 14, wherein
(i) M1 represents one or more of K, Mg, Ca, Y, Ti, Zr, Hf, V, Ta, Cr, Mo, W, Mn, Fe, Co, Ni, Cu, Zn, Al, Ga, Si, Ge, Sn, Sb; or
(ii) M1 represents one or more of Ti, Mg, V, Cr, W, Zr, Mo, Cu, Ga, Ge, K, Ni, Al, Hf, Ta, or Zn; or
(iii) M1 represents one or more of Ti, Mg, V, Cr, W, Zr, Mo, Ga, Ge, Al, or Zn.

17. The method of claim 14, wherein
(i) x satisfies 0.01≤x≤0.4; and/or
(ii) x satisfies 0.05≤x≤0.25; and/or
(iii) x is about 0.05.

18. The method of claim 1, wherein the mixed niobium oxide is expressed by the formula $[M1]_x[M2]_{(1-x)}[Nb]_y[O]_z$, wherein:
M1 and M2 are different;
M1 represents one or more of Ti, Mg, V, Cr, W, Zr, Mo, Cu, Fe, Ga, Ge, Ca, K, Ni, Co, Al, Sn, Mn, Ce, Te, Se, Si, Sb, Y, La, Hf, Ta, Re, Zn, In, or Cd;
M2 represents one or more of Mg, V, Cr, W, Zr, Mo, Cu, Ga, Ge, Ca, K, Ni, Co, P, Al, Sn, Mn, Ce, Sb, Y, La, Hf, Ta, Zn, In, or Cd; and wherein
x satisfies 0<x<0.5;
y satisfies 0.5≤y≤49; and
z satisfies 4≤z≤124.

19. The method of claim 1, wherein the mixed niobium oxide has the formula $M1_xMo_{(1-x)}Nb_{12}O_{(33-33\alpha)}$ where M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, or Sb; and wherein x satisfies 0<x<0.5; and α satisfies 0≤α≤0.05.

20. The method of claim 1, wherein the mixed niobium oxide has the formula $M1_xW_{(1-x)}Nb_{0.57}O_{(4.43-4.43\alpha)}$ where M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, or Sb; and wherein x satisfies 0<x<0.5; and α satisfies 0≤α≤0.05.

21. The method of claim 1, wherein the mixed niobium oxide has the formula $M1_xZn_{(1-x)}Nb_{17}O_{(43.5-43.5\alpha)}$ where M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, or Sb; and wherein x satisfies 0<x<0.5; and α satisfies 0≤α≤0.05.

22. The method of claim 1, wherein the mixed niobium oxide has the formula $M1_xAl_{(1-x)}Nb11O_{(29-29\alpha)}$ where M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, or Sb; and wherein x satisfies 0<x<0.5; and α satisfies 0≤α≤0.05.

23. The method of claim 1, wherein the crystal structure of the mixed niobium oxide does not correspond to the crystal structure of $TiNb_2O_7$.

24. The method of claim 1, wherein the active electrode material is in particulate form, wherein the active electrode material has a D50 particle diameter in the range of 0.1 100 µm, or 0.5-50 µm, or 1-15 µm.

25. The method of claim 1, wherein the active electrode material has a BET surface area in the range of 0.1-100 m²/g, or 0.5-50 m²/g, or 1-20 m²/g.

26. The method of claim 1, wherein the mixed niobium oxide is expressed by the formula $[M1]_x[M2]_{(1-x)}[Nb]_y[O]_z$:
M1 and M2 are different;
M1 represents one or more of Ti, Mg, V, Cr, W, Zr, Nb, Mo, Cu, Fe, Ga, Ge, K, Ni, Al, Ta, or Zn;
M2 represents one or more of Mg, V, Cr, W, Zr, Nb, Mo, Cu, Fe, Ga, Ge, Zn, Ca, K, Ni, Al, Mn, Hf or Ta; and wherein
x satisfies 0<x<0.5;
y satisfies 0.5≤y≤49; and
z satisfies 4≤z≤124.

27. The method of claim 1, wherein the mixed niobium oxide is expressed by the formula $[M1]_x[M2]_{(1-x)}[Nb]_y[O]_z$, wherein:
M1 and M2 are different;
M1 represents one or more of Ti, Mg, V, Cr, W, Zr, Mo, Cu, Ga, Ge, K, Ni, Al, Hf, Ta, or Zn;
M2 represents one or more of Mo, W, V, Zr, Al, Ga, Ge, Zn, Ta, Cu, K, or Mg; and wherein
x satisfies 0<x<0.5;
y satisfies 0.5≤y≤49; and
z satisfies 4≤z≤124;
wherein the intermediate material comprises the carbon precursor in an amount of 0.2-8 wt %, based on the total weight of the mixed niobium oxide and the carbon precursor; and
wherein the carbon coating on the active electrode material is present in an amount of 0.1-3 wt %, based on the total weight of the active electrode material.

28. The method of claim 1, wherein the mixed niobium oxide has the formula:
(i) $M1_xMo_{(1-x)}Nb_{12}O_{(33-33\alpha)}$ where M1 represents one or more of Ti, Mg, V, Cr, W, Zr, Mo, Ga, Ge, Al, or Zn; and wherein x satisfies 0<x<0.5; and α satisfies 0≤α≤0.05; or (ii) $M1_xW_{(1-x)}Nb_{0.57}O_{(4.43-4.43\alpha)}$ where M1 represents one or more of Ti, Mg, V, Cr, W, Zr, Mo, Ga, Ge, Al, or Zn; and wherein x satisfies $0<x<0.5$; and $\alpha$ satisfies $0\leq\alpha\leq0.05$; or (iii) $M1_xZn_{(1-x)}Nb_{17}O_{(43.5-43.5\alpha)}$ where M1 represents one or more of Ti, Mg, V, Cr, W, Zr, Mo, Ga, Ge, Al, or Zn; and wherein x satisfies $0<x<0.5$; and $\alpha$ satisfies $0\leq\alpha\leq0.05$; or (iv) $M1_xAl_{(1-x)}Nb_{11}O_{(29-29\alpha)}$ where M1 represents one or more of Ti, Mg, V, Cr, W, Zr, Mo, Ga, Ge, Al, or Zn; and wherein x satisfies $0<x<0.5$; and $\alpha$ satisfies $0\leq\alpha\leq0.05$; and wherein the intermediate material comprises the carbon precursor in an amount of 0.2-8 wt %, based on the total weight of the mixed niobium oxide and the carbon precursor;

wherein the carbon coating on the active electrode material is present in an amount of 0.1-3 wt %, based on the total weight of the active electrode material;

wherein the carbon precursor is petroleum pitch.

29. The method of claim 1, wherein the carbon precursor is petroleum pitch.

30. A method of making an electrode, comprising making an active electrode material by following the method of claim 1, and forming an electrode comprising the active electrode material in electrical contact with a current collector.

* * * * *